United States Patent
Hsu et al.

(10) Patent No.: US 11,865,967 B2
(45) Date of Patent: Jan. 9, 2024

(54) ADAPTIVE ILLUMINATION SYSTEM FOR AN AUTONOMOUS VEHICLE

(71) Applicant: TuSimple, Inc., San Diego, CA (US)

(72) Inventors: Yu-Ju Hsu, Tucson, AZ (US); Xiaoling Han, San Diego, CA (US); Yijing Li, Tucson, AZ (US); Zehua Huang, San Diego, CA (US); Lingting Ge, San Diego, CA (US); Panqu Wang, San Diego, CA (US); Shuhan Yang, Phoenix, AZ (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/149,901

(22) Filed: Jan. 4, 2023

(65) Prior Publication Data
US 2023/0219488 A1     Jul. 13, 2023

Related U.S. Application Data

(60) Provisional application No. 63/266,547, filed on Jan. 7, 2022.

(51) Int. Cl.
*B60Q 1/14* (2006.01)
*G06V 20/58* (2022.01)

(52) U.S. Cl.
CPC ........ *B60Q 1/143* (2013.01); *B60Q 2300/054* (2013.01); *B60Q 2300/42* (2013.01); *G06V 20/58* (2022.01)

(58) Field of Classification Search
None
See application file for complete search history.

(56) References Cited

U.S. PATENT DOCUMENTS

| | | | |
|---|---|---|---|
| 2019/0077304 A1* | 3/2019 | Nakashima | F21S 41/65 |
| 2019/0176684 A1 | 6/2019 | Zych | |
| 2020/0114805 A1* | 4/2020 | Ridler | H05B 47/11 |
| 2020/0195831 A1 | 6/2020 | Muramatsu et al. | |
| 2020/0317113 A1 | 10/2020 | Dingli | |

(Continued)

FOREIGN PATENT DOCUMENTS

| | | |
|---|---|---|
| EP | 1837803 A2 | 9/2007 |
| EP | 3876143 A1 | 9/2021 |
| EP | 3882076 A1 | 9/2021 |

OTHER PUBLICATIONS

International Search Report and Written Opinion for Application No. PCT/US2023/060126, dated Apr. 28, 2023.

*Primary Examiner* — Wilson Lee
(74) *Attorney, Agent, or Firm* — Paul Liu; Glenn Theodore Mathews; Baker Botts LLP

(57) ABSTRACT

A system comprises a headlight mounted on an autonomous vehicle. The headlight is configured to illuminate at least a portion of a road the autonomous vehicle is on. The system further comprises a control device associated with the autonomous vehicle. The processor obtains information about an environment around the autonomous vehicle. The processor determines that at least a portion of the road should be illuminated if the information indicates that an illumination level of the portion of the road is less than a threshold illumination level. The processor adjusts the headlight to illuminate at least the portion of the road in response to determining that at least the portion of the road should be illuminated.

20 Claims, 8 Drawing Sheets

(56) References Cited

U.S. PATENT DOCUMENTS

| | | |
|---|---|---|
| 2021/0129743 A1 | 5/2021 | Hsu et al. |
| 2021/0213870 A1* | 7/2021 | Martin ................... B60Q 1/143 |
| 2022/0034470 A1* | 2/2022 | Chen ...................... F21S 41/27 |
| 2022/0105862 A1* | 4/2022 | Unterweger ......... B60Q 11/005 |

* cited by examiner

ADAPTIVE ILLUMINATION SYSTEM FOR AN AUTONOMOUS VEHICLE

RELATED APPLICATION AND CLAIM TO PRIORITY

This application claims priority to U.S. Provisional Application No. 63/266,547 filed Jan. 7, 2022, and titled "AN ADAPTIVE ILLUMINATION SYSTEM FOR AN AUTONOMOUS VEHICLE," which is incorporated herein by reference.

TECHNICAL FIELD

The present disclosure relates generally to autonomous vehicles. More particularly, the present disclosure is related to an adaptive illumination system for an autonomous vehicle.

BACKGROUND

One aim of autonomous vehicle technologies is to provide vehicles that can safely navigate towards a destination. Sometimes autonomous vehicles may need to travel at night or in dark areas. It is challenging to navigate an autonomous vehicle while traveling at night or in dark areas. For example, detecting objects, road markings, and road signs at night or in dark areas may be difficult for particular sensors of the autonomous vehicle.

SUMMARY

This disclosure recognizes various problems and previously unmet needs related to implementing safe navigation for an autonomous vehicle in situations where the autonomous vehicle is traveling at night or the environment around the autonomous vehicle is otherwise dark, the autonomous vehicle is traveling toward a road turn (e.g., left or right turn) where there is at least one blind spot on the road that the sensor data captured by the sensors of the autonomous vehicle does not provide enough information about, or the autonomous vehicle is traveling through a bridge or a tunnel. Certain embodiments of the present disclosure provide unique technical solutions to technical problems of current autonomous vehicle technologies, including those problems described above to implement an adaptive illumination system to illuminate the traveling path of the autonomous vehicle.

The present disclosure contemplates systems and methods for implementing an adaptive illumination system of an autonomous vehicle. For example, the illumination system may comprise one or more headlights associated with the autonomous vehicle. Each headlight may be adapted to turn on and off low beam light sources, high beam light sources, left-side light sources, and right-side light sources. Each light source of a headlight may be an optical light source (e.g., visible light source) or an infrared light source (e.g., invisible light source). A headlight may further be adapted to adjust the intensity of a light source. For example, the disclosed system may adjust the intensity of a light source between 0% to 100% depending on a particular situation.

The disclosed system may adjust a headlight depending on a situation that the autonomous vehicle encounters. For example, if oncoming traffic on the opposite side of the road with respect to the autonomous vehicle is detected, the disclosed system may turn on low beam light sources and/or infrared light sources. This may lead to avoid blinding drivers in the oncoming traffic. In another example, if no oncoming traffic is detected, the disclosed system may turn on high beam light sources and/or infrared light sources. In another example, if it is determined that the autonomous vehicle is approaching a tunnel, the disclosed system may turn on low beam or high beam light sources and/or infrared light sources according to a traffic rule policy (e.g., depending on oncoming traffic inside the tunnel). In another example, if it is determined that the autonomous vehicle is approaching a left turn, the disclosed system may turn on left-side light sources and/or left-side infrared light sources to provide a better lighting condition to a curved portion of the left turn. In another example, the disclosed system may perform a similar operation with respect to a right turn. If it is determined that the autonomous vehicle is approaching a right turn, the disclosed system may turn on right-side light sources and/or right-side infrared light sources to provide a better lighting condition to a curved portion of the right turn.

In another example, if a light condition level of an image captured by a camera sensor of the autonomous vehicle is low (e.g., less than a threshold light condition level) or otherwise the image is dark, the disclosed system may increase the intensity of light sources (e.g., optical and/or infrared light sources) until a light condition level of a second image (e.g., captured after increasing the intensity of the light sources) is at least equal to the threshold light condition level.

In another example, if a light condition level of an infrared image captured by an infrared camera sensor of the autonomous vehicle is low (e.g., less than a threshold light condition level) or otherwise the infrared image is dark, the disclosed system may increase the intensity of light sources (e.g., optical and/or infrared light sources) until a light condition level of a second infrared image (e.g., captured after increasing the intensity of the light sources) is at least equal to the threshold light condition level.

In certain embodiments, in any of the example situations described above, the disclosed system may adjust (e.g., increase) the intensity of the light sources (e.g., optical and/or infrared light sources) until an illumination level of a traveling path of the autonomous vehicle becomes at least equal to a threshold illumination level. The threshold illumination level may be configured to indicate a suitable illumination level (e.g., least amount of necessary illumination) of the traveling path that is safe for the autonomous vehicle to travel.

Accordingly, the disclosed system may be integrated into practical applications of improving the perception of autonomous vehicle's sensors and improving autonomous vehicle's sensors visibility. For example, by implementing the adaptive illumination system for the autonomous vehicle, the traveling path of the autonomous vehicle is illuminated, which leads to the sensors of the autonomous vehicle to be able to detect objects in the traveling path of the autonomous vehicle more accurately. Thus, the disclosed system can determine a safer traveling pathway for the autonomous vehicle. Thus, the autonomous vehicle can travel more safely, and cars surrounding the autonomous vehicle can also travel more safely.

The disclosed system may further be integrated into an additional practical application of improving the autonomous navigation of autonomous vehicles. In other words, the disclosed system improves the autonomous vehicle navigation technology. For example, the disclosed system may allow autonomous vehicles to travel at night with minimum or no human intervention. In another example, the disclosed system may allow autonomous vehicles to travel in routes that include tunnels or bridges with minimum or no human intervention. In another example, the disclosed system may allow autonomous vehicles to travel in routes that include unconventional left or right turns that are difficult to navigate without the proposed solution of the disclosed system to adjust the illumination on left or right corners, respectively. In another example, the disclosed system may allow autonomous vehicles to identify and maneuver around (or through) blind spots that can arise due to not enough sensor perception or light by eliminating such blind spots by adjusting the illumination directed to those spots. In this manner, this disclosed system provides technical solutions to overcome the current problems that specifically arise in the autonomous vehicle navigation technology.

In one embodiment, a system comprises at least one headlight mounted on an autonomous vehicle. In another embodiment, a system comprises at least two headlights mounted on an autonomous vehicle. The headlight may be configured to illuminate at least a portion of a road on which the autonomous vehicle is travelling. The system further comprises a control device associated with the autonomous vehicle. The processor may obtain information about an environment around the autonomous vehicle. The processor may determine that at least a portion of the road should be illuminated if the information indicates that an illumination level of the portion of the road is less than a threshold illumination level. The processor may adjust the at least one headlight to illuminate at least the portion of the road in response to determining that at least the portion of the road should be illuminated.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe navigation solutions for an autonomous vehicle in situations where the autonomous vehicle travels at night or otherwise the environment around the autonomous vehicle is dark, the autonomous vehicle is traveling toward a road turn (e.g., left or right turn) where there is at least one blind spot on the road that the sensor data captured by the sensors of the autonomous vehicle does not provide enough information about, or the autonomous vehicle is traveling through a bridge or a tunnel. The present disclosure provides various systems, methods, and devices to implement an adaptive illumination system to illuminate the traveling path of the autonomous vehicle.

Figure 1:
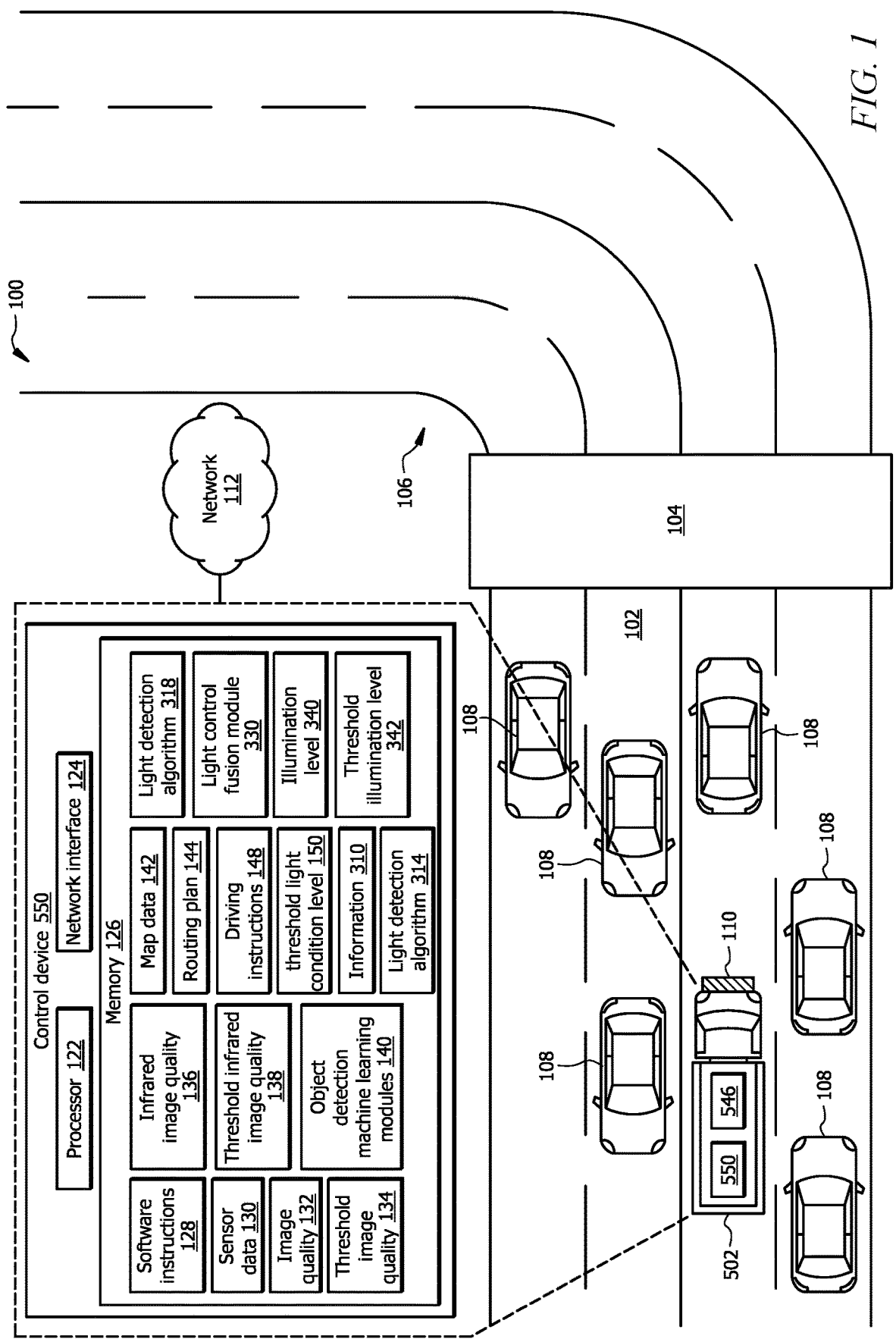
FIG. 1 illustrates an embodiment of a system for implementing an adaptive illumination system for an autonomous vehicle.

Example System to Implement an Adaptive Illumination System for an Autonomous Vehicle FIG. 1 illustrates an embodiment of a system 100 configured to implement adaptive illumination for an autonomous vehicle 502. FIG. 1 further illustrates a simplified schematic diagram of a road 102 travelled by an autonomous vehicle 502. In certain embodiments, system 100 may comprise an autonomous vehicle 502. The autonomous vehicle 502 may comprise a control device 550. The control device 550 may comprise a processor 122 in signal communication with a memory 126. Memory 126 may store software instructions 128 that when executed by the processor 122, cause the control device 550 to perform one or more operations described herein. For example, when the software instructions 128 are executed, the control device 550 may determine whether at least a portion of the road 102 which the autonomous vehicle 502 is on should be illuminated, and if it is determined that at least a portion of the road 102 in front of the autonomous vehicle 502 should be illuminated, the control device 550 may adjust a headlight 110 to illuminate at least the portion of the road. Although FIG. 1 illustrates autonomous vehicle 502 with a single headlight 110 that extends horizontally across the front of the vehicle, it should be understood that autonomous vehicle 502 may include any suitable number and combination of headlights 110 shaped, arranged, and located as appropriate for particular designs of the autonomous vehicle 502. In certain embodiments, system 100 may further comprise a network 112. Network 112 allows the autonomous vehicle 502 to communicate with other autonomous vehicles 502, systems, servers, devices, etc. In other embodiments, system 100 may not have all of the components listed and/or may have other elements instead of, or in addition to, those listed above. System 100 may be configured as shown or in any other configuration.

One optional approach to determine whether a portion of the road 102 should be illuminated is to use a light sensor. The light sensor may be configured to detect brightness of its surroundings. However, detection of brightness of an environment around the light sensor may depend on a location of the light sensor (e.g., front of the autonomous vehicle 502, back of the autonomous vehicle 502, or any other location with respect to the autonomous vehicle 502) and a detection range of the light sensor (e.g., one feet, two feet, etc.). Thus, relying solely on the light sensor may not provide a comprehensive understanding about the illumination situation surrounding the autonomous vehicle 502 and whether a traveling path of the autonomous vehicle 502 is illuminated or should be illuminated to provide safer driving conditions for the autonomous vehicle 502, other vehicles surrounding the autonomous vehicle 502, and pedestrians.

Thus, system 100 may be configured to use additional data to provide a more comprehensive understanding about the illumination situation surrounding the autonomous vehicle 502 and determine an illumination level of a traveling path of the autonomous vehicle 502. Thus, the system 100 may be configured to adjust the headlight 110 to dynamically illuminate a traveling path of the autonomous vehicle 502. Certain example scenarios where the system 100 may adjust the headlight 110 to dynamically illuminate a traveling path of the autonomous vehicle 502 are described below.

In an example scenario, while traveling along the road 102, the autonomous vehicle 502 may approach a covered portion of the road 102, such as a bridge or a tunnel 104. In such a case, the system 100 may determine that the traveling path of the autonomous vehicle 502 should be illuminated because, among other reasons, the lighting conditions inside a tunnel 104 are often reduced compared to daylight conditions. Thus, the system 100 may adjust the headlight 110 to illuminate the traveling path of the autonomous vehicle 502 before the autonomous vehicle 502 enters the tunnel 104 (or goes under the bridge). For example, the system 100 may turn on high beam light sources of the headlight 110 while the autonomous vehicle 502 is traveling inside the tunnel 104 (or traveling under the bridge). In certain embodiments, the system 100 may turn on one or more of high beam light sources and high beam infrared light sources of the headlight 110. In certain embodiments, if oncoming traffic is detected inside the tunnel 104, system 100 may turn on low beam light sources and/or low beam infrared light sources of the headlight 110.

In another example scenario, while traveling along the road 102, the autonomous vehicle 502 may encounter oncoming traffic, such as the vehicle(s) 108. In such a case, the system 100 may determine that the headlight 110 may need to be adjusted to avoid blinding passengers in the vehicle 108. For example, the system 100 may turn on low beam light sources of the headlight 110 until the autonomous vehicle 502 passes by the vehicle 108. In certain embodiments, the system 100 may turn on one or more of low beam light sources and low beam infrared light sources of the headlight 110.

In another example scenario, while traveling along the road 102, the autonomous vehicle 502 may approach a left turn 106. In such a case, the system 100 may determine that side light source(s) of the headlight 110 (e.g., left-side light sources 202b (see FIGS. 2A and 2B)) may need to be turned on to provide a better illumination on the curved side of at least a portion of the traveling path of the autonomous vehicle 502. In certain embodiments, the system 100 may turn on one or more of left-side light sources 202b (see FIGS. 2A and 2B) and left-side infrared light sources 202b (see FIGS. 2A and 2B) of the headlight 110.

Similarly, in another example scenario, while traveling along the road 102, the autonomous vehicle 502 may approach a right turn. In such a case, the system 100 may determine that side light source(s) of the headlight 110 (e.g., right-side light sources 202a (see FIGS. 2A and 2B)) may need to be turned on to provide a better illumination on the curved side of at least a portion of the traveling path of the autonomous vehicle 502. In certain embodiments, the system 100 may turn on one or more of right-side light sources 202a (see FIGS. 2A and 2B) and right-side infrared light sources 202a (see FIGS. 2A and 2B) of the headlight 110.

In any of the example scenarios described above and any other example scenarios described below, the system 100 may dynamically adjust the intensity of light sources and/or the intensity of infrared light sources of the headlight 110, for example, between 0% to 100% based on the determined illumination level 340 of a traveling path of the autonomous vehicle 502. For example, if the illumination level 340 of at least a portion of the traveling path of the autonomous vehicle 502 is determined to be low (e.g., 10%), the system 100 may increase the intensity of the light sources and/or the intensity of the infrared light sources of the headlight 110 to, for example, 80%, 85%, or any other suitable intensity level until the illumination level 340 of at least a portion of the traveling path of the autonomous vehicle 502 is determined to be more than a threshold illumination level 342. In one embodiment, the threshold illumination level 342 may be configured to indicate the least illumination level 340 of at least a portion of the traveling path of the autonomous vehicle 502 that is safe for the autonomous vehicle 502 to travel. The threshold illumination level 342 may be adjusted depending on different road, traffic, safety, weather conditions experienced by the autonomous vehicle 502, lighting conditions experienced by the autonomous vehicle 502 at different times, and the traveling speed of the autonomous vehicle 502.

Details of the operation of system 100 to determine an illumination level 340 of a traveling path of the autonomous vehicle 502 and to adjust the headlight 110 to dynamically illuminate a traveling path of the autonomous vehicle 502 are described in greater detail below in conjunction with an operational flow 300 of system 100 described in FIG. 3.

System Components

Example Autonomous Vehicle

Figure 5:
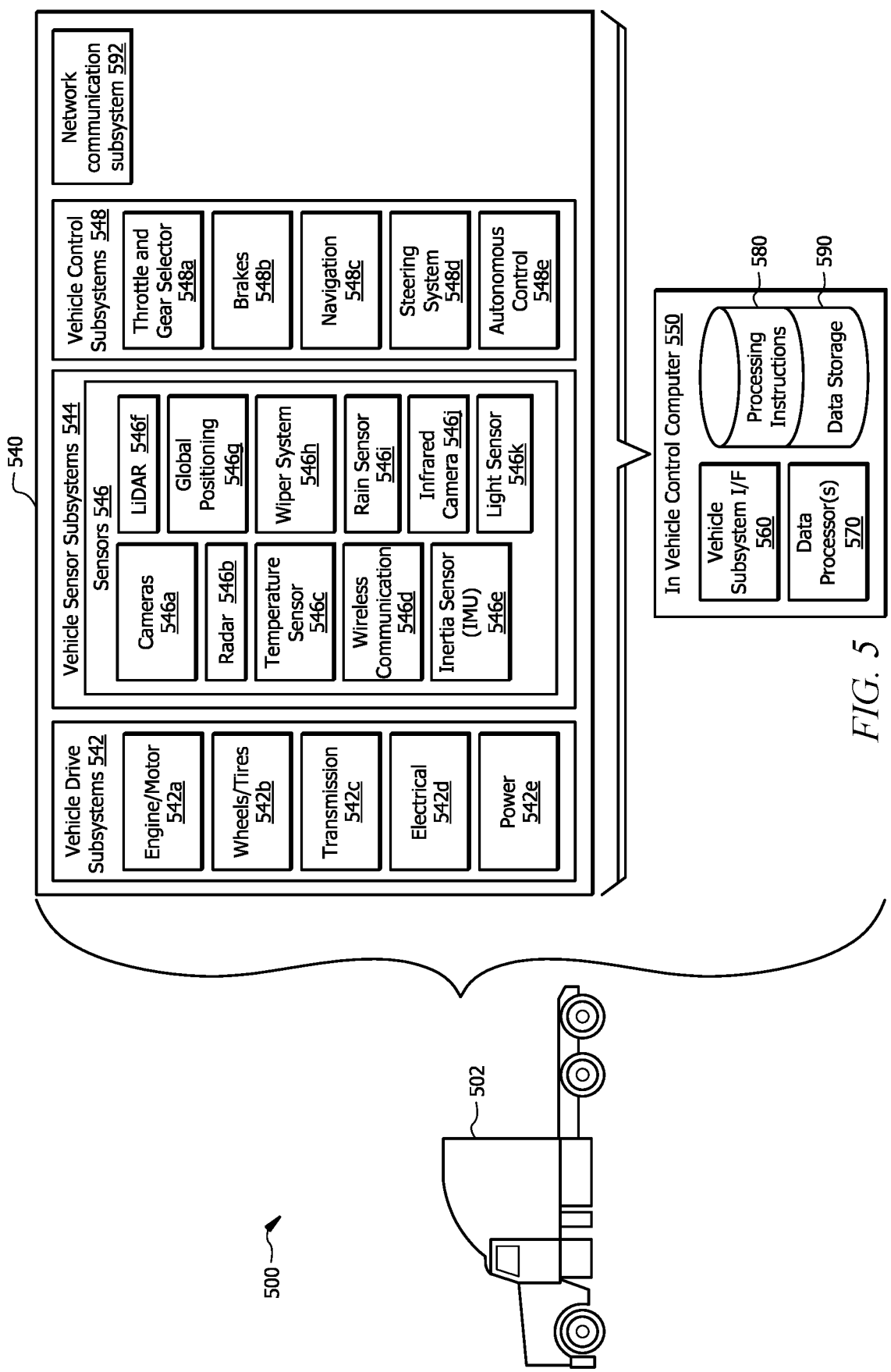
FIG. 5 illustrates a block diagram of an example autonomous vehicle configured to implement autonomous driving operations.

In one embodiment, the autonomous vehicle 502 may include a semi-truck tractor unit attached to a trailer to transport cargo or freight from one location to another location (see FIG. 5). The autonomous vehicle 502 is generally configured to travel along a road 102 in an autonomous mode. The autonomous vehicle 502 may navigate using a plurality of components described in detail in FIGS. 5-7. The operation of the autonomous vehicle 502 is described in greater detail in FIGS. 5-7. The corresponding description below includes brief descriptions of certain components of the autonomous vehicle 502.

Control device 550 may be generally configured to control the operation of the autonomous vehicle 502 and its components and to facilitate autonomous driving of the autonomous vehicle 502. The control device 550 may be further configured to determine a pathway in front of the autonomous vehicle 502 that is safe to travel and free of objects or obstacles, and navigate the autonomous vehicle 502 to travel in that pathway. This process is described in more detail in FIGS. 5-7. The control device 550 may generally include one or more computing devices in signal communication with other components of the autonomous vehicle 502 (see FIG. 5). In this disclosure, the control device 550 may interchangeably be referred to as an in-vehicle control computer 550.

The control device 550 may be configured to detect objects on and around road 102 by analyzing the sensor data 130 and/or map data 142. For example, the control device 550 may detect objects on and around road 102 by implementing object detection machine learning modules 140. The object detection machine learning module 140 may be implemented using neural networks and/or machine learning algorithms for detecting objects from images, videos, infrared images, point clouds, radar data, etc. The object detection machine learning module 140 is described in more detail further below. The control device 550 may receive sensor data 130 from the sensors 546 positioned on the autonomous vehicle 502 to determine a safe pathway to travel. The sensor data 130 may include data captured by the sensors 546.

Sensors 546 may be configured to capture any object within their detection zones or fields of view, such as landmarks, lane markers, lane boundaries, road boundaries, vehicles, pedestrians, road/traffic signs, among others. In some embodiments, the sensors 546 may be configured to detect rain, fog, snow, and/or any other weather condition.

The sensors 546 may include rain sensors, cameras, infrared cameras, (Light Detection and Ranging) LiDAR sensors, motion sensors, infrared sensors, and the like. In some embodiments, the sensors 546 may be positioned around the autonomous vehicle 502 to capture the environment surrounding the autonomous vehicle 502. See the corresponding description of FIG. 5 for further description of the sensors 546.

Control Device

The control device 550 is described in greater detail in FIG. 5. In brief, the control device 550 may include the processor 122 in signal communication with the memory 126 and a network interface 124. The processor 122 may include one or more processing units that perform various functions as described herein. The memory 126 may store any data and/or instructions used by the processor 122 to perform its functions. For example, the memory 126 may store software instructions 128 that when executed by the processor 122 causes the control device 550 to perform one or more functions described herein.

The processor 122 may be one of the data processor 570 described in FIG. 5. The processor 122 comprises one or more processors operably coupled to the memory 126. The processor 122 may be any electronic circuitry, including state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 may be communicatively coupled to and in signal communication with the network interface 124 and memory 126. The one or more processors may be configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-7. In some embodiments, the function described herein is implemented using logic units, FPGAs, ASICs, DSPs, or any other suitable hardware or electronic circuitry.

Network interface 124 may be a component of the network communication subsystem 592 described in FIG. 5. The network interface 124 may be configured to enable wired and/or wireless communications. The network interface 124 may be configured to communicate data between the autonomous vehicle 502 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol as would be appreciated by one of ordinary skill in the art.

The memory 126 may be one of the data storages 590 described in FIG. 5. The memory 126 may store any of the information described in FIGS. 1-7 along with any other data, instructions, logic, rules, or code operable to implement the function(s) described herein when executed by processor 122. For example, the memory 126 may store software instructions 128, sensor data 130, image quality 132, threshold image quality 134, infrared image quality 136, threshold infrared image quality 138, object detection machine learning module 140, map data 142, routing plan 144, driving instructions 148, environmental information 310 (around the autonomous vehicle 502), illumination level 340, threshold illumination level 342, light control fusion module 330, threshold light condition level 150, light detection algorithm 314, light detection algorithm 318, and/or any other data/instructions. The software instructions 128 include code that when executed by the processor 122 causes the control device 550 to perform the functions described herein, such as some or all of those described in FIGS. 1-7. The memory 126 comprises one or more disks, tape drives, or solid-state drives, and may be used as an over-flow data storage device, to store programs when such programs are selected for execution, and to store instructions and data that are read during program execution. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc.

Object detection machine learning modules 140 may be implemented by the processor 122 executing software instructions 128, and may be generally configured to detect objects and obstacles from the sensor data 130. The object detection machine learning modules 140 may be implemented using neural networks and/or machine learning algorithms for detecting objects from any data type, such as images, videos, infrared images, point clouds, Radar data, etc.

In some embodiments, the object detection machine learning modules 140 may be implemented using machine learning algorithms, such as Support Vector Machine (SVM), Naive Bayes, Logistic Regression, k-Nearest Neighbors, Decision Trees, or the like. In some embodiments, the object detection machine learning modules 140 may utilize a plurality of neural network layers, convolutional neural network layers, and/or the like, in which weights and biases of these layers are optimized in the training process of the object detection machine learning modules 140. The object detection machine learning modules 140 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, Radar data, etc. labeled with object(s) in each sample data. The object detection machine learning modules 140 may be trained, tested, and refined by the training dataset and the sensor data 130. The object detection machine learning modules 140 use the sensor data 130 (which are not labeled with objects) to increase their accuracy of predictions in detecting objects. For example, supervised and/or unsupervised machine learning algorithms may be used to validate the predictions of the object detection machine learning modules 140 in detecting objects in the sensor data 130.

Map data 142 may include a virtual map of a city or an area that includes the road 102. In some examples, the map data 142 may include the map 658 and map database 636 (see FIG. 4 for descriptions of the map 658 and map database 636). The map data 142 may include drivable areas, such as roads 102, paths, highways, and undrivable areas, such as terrain (determined by the occupancy grid module 660, see FIG. 6 for descriptions of the occupancy grid module 660). The map data 142 may specify location coordinates of road signs, lanes, lane markings, lane boundaries, road boundaries, traffic lights, obstacles, etc.

Routing plan 144 may be a plan for traveling from a start location (e.g., a first autonomous vehicle launchpad/landing pad) to a destination (e.g., a second autonomous vehicle launchpad/landing pad). For example, the routing plan 144 may specify a combination of one or more streets, roads, and highways in a specific order from the start location to the destination. The routing plan 144 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 144 may include other information about the route from the start position to the destination, such as road/traffic signs in that routing plan 144, etc.

Figure 6:
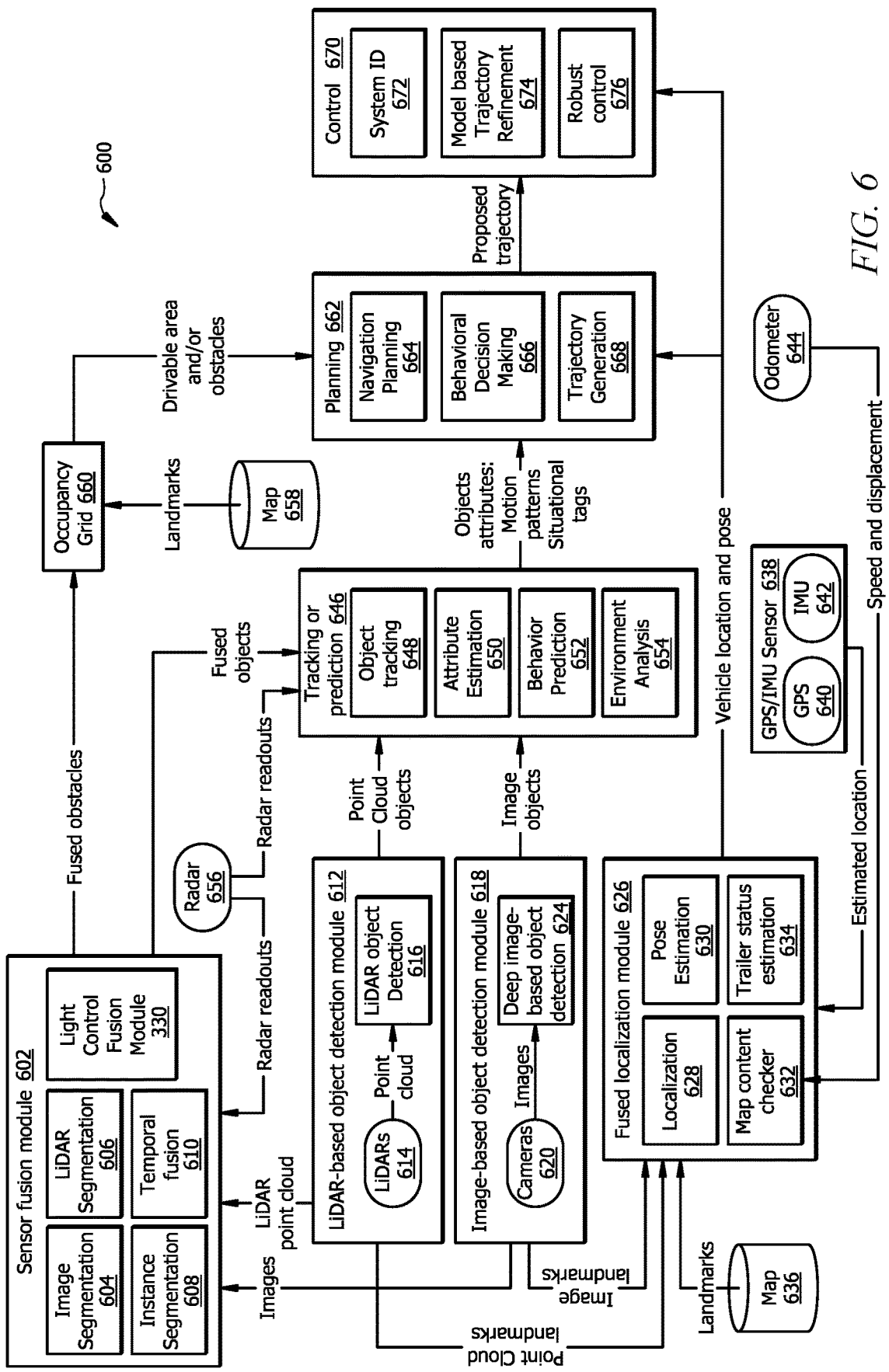
FIG. 6 illustrates an example system for providing autonomous driving operations used by the autonomous vehicle of FIG. 5.

Driving instructions 148 may be implemented by the planning module 662 (See descriptions of the planning module 662 in FIG. 6.). The driving instructions 148 may include instructions and rules to adapt the autonomous driving of the autonomous vehicle 502 according to the driving rules of each stage of the routing plan 144. For example, the driving instructions 148 may include instructions to stay within the speed range of a road 102 traveled by the autonomous vehicle 502, adapt the speed of the autonomous vehicle 502 with respect to observed changes by the sensors 546, such as speeds of surrounding vehicles, objects within the detection zones of the sensors 546, etc. In one example, in case a traveling path of the autonomous vehicle 502 is not illuminated or the illumination level 340 of at least a portion of the traveling path of the autonomous vehicle 502 is less than the threshold illumination level 342, the driving instructions 148 may send a front light assist request to the control device 550. The front light assist request may indicate that the illumination level 340 of at least a portion of the traveling path of the autonomous vehicle 502 is less than the threshold illumination level 342 and/or it is not safe for the autonomous vehicle to travel along the pathway. In another example, assuming that the autonomous vehicle 502 is approaching a turn road (e.g., left or right turn), the driving instructions 148 may send a side light assist request to the control device 550. The side light assist request may indicate that the illumination level 340 of at least a portion of the traveling path of the autonomous vehicle 502 is less than the threshold illumination level 342 and/or it is not safe for the autonomous vehicle to travel along the pathway.

Headlight 110 may comprise a light-emitting apparatus and may be generally configured to emit light and/or infrared light. In certain embodiments, the system 100 may comprise any number of headlights 110 mounted on an autonomous vehicle 502. The headlight 110 may be communicatively coupled with the control device 550, for example, by wireless communication protocols, such as WiFi, Bluetooth, etc., or by wires. In certain embodiments, the headlight 110 may include light emitting diodes (LEDs), light bulbs, infrared light LEDs (IR LEDs), infrared light emitters, among other light sources. Example embodiments of the headlight 110 are described further below in conjunction with FIGS. 2A and 2B.

In certain embodiments, the headlight 110 may include multiple light sources. For example, the headlight 110 may include one or more optical light sources (e.g., visible light sources), one or more infrared light sources (e.g., invisible light sources), one or more near-infrared light sources, light sources with wavelengths within the light spectrum, or any combination thereof. Each light source of the headlight 110 may be controlled to emit high beam or low beam light. In certain embodiments, each light source of the headlight 110 may be controlled individually. For example, each light source of the headlight 110 may individually controllable in terms of intensity, e.g., power level, and/or direction.

In certain embodiments, each subset of light sources of the headlight 110 may be controlled individually. For example, each subset of light sources of the headlight 110 may individually controllable in terms of intensity, e.g., power level, and/or direction.

The headlight 110 may be controlled by the control device 550. In some examples, the control device 550 may adjust the headlight 110 by activating one or more light sources of the headlight 110, such as turning on/off front low beam light sources, turning on/off front high beam light sources, turning on/off left side light sources, turning on/off right side light sources, adjusting the intensity of front light sources, adjusting the intensity of left side light sources, and adjusting the intensity of right side light sources.

In other examples, the control device 550 may adjust the headlight 110 by activating one or more infrared light sources of the headlight 110, such as turning on/off front low beam infrared light sources, turning on/off front high beam infrared light sources, turning on/off left side infrared light sources, turning on/off right side infrared light sources, adjusting the intensity of front infrared light sources, adjusting the intensity of left side infrared light sources, and adjusting the intensity of right side infrared light sources.

Figure 3:
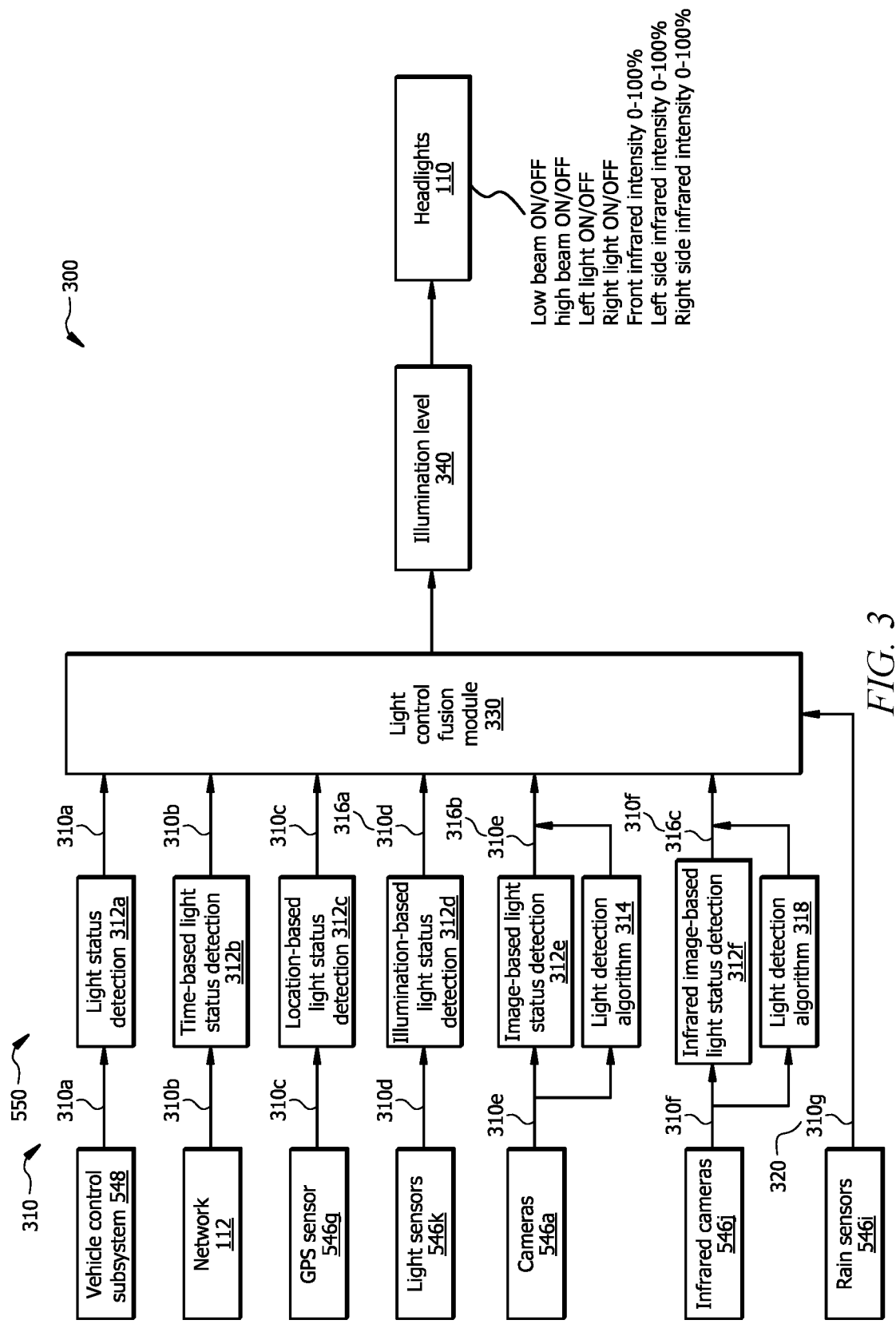
FIG. 3 illustrates an example operational flow of the system of FIG. 1 to determine an illumination level of a traveling path of an autonomous vehicle.

Various example scenarios where the control device 550 may adjust the headlight 110 are described in FIG. 3 in conjunction with the operational flow 300 of system 100.

Network 112 may include any interconnecting system capable of transmitting audio, video, signals, data, messages, or any combination of the preceding. Network 112 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Headlight

Figure 2A:
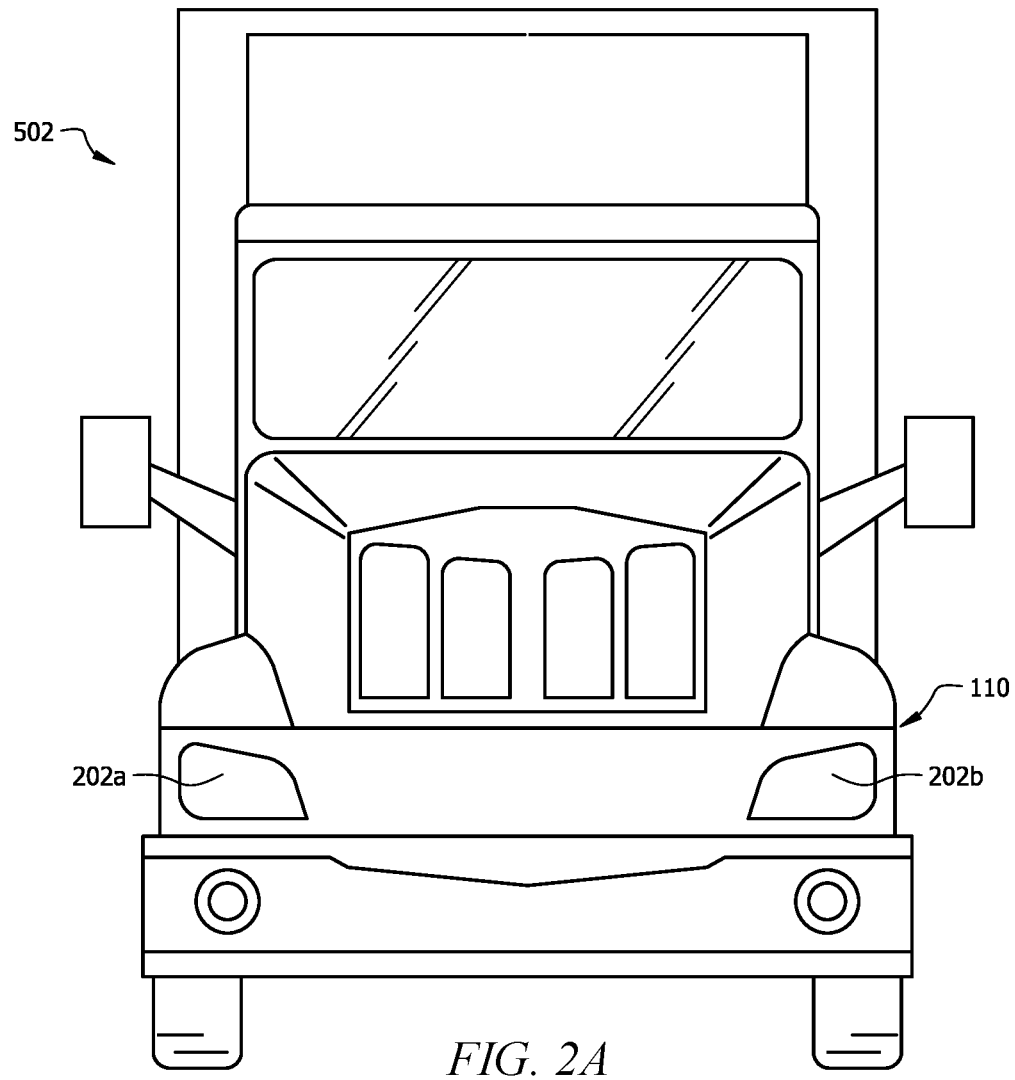
FIGS. 2A and 2B illustrate example embodiments of a headlight of an autonomous vehicle.
Figure 2B:
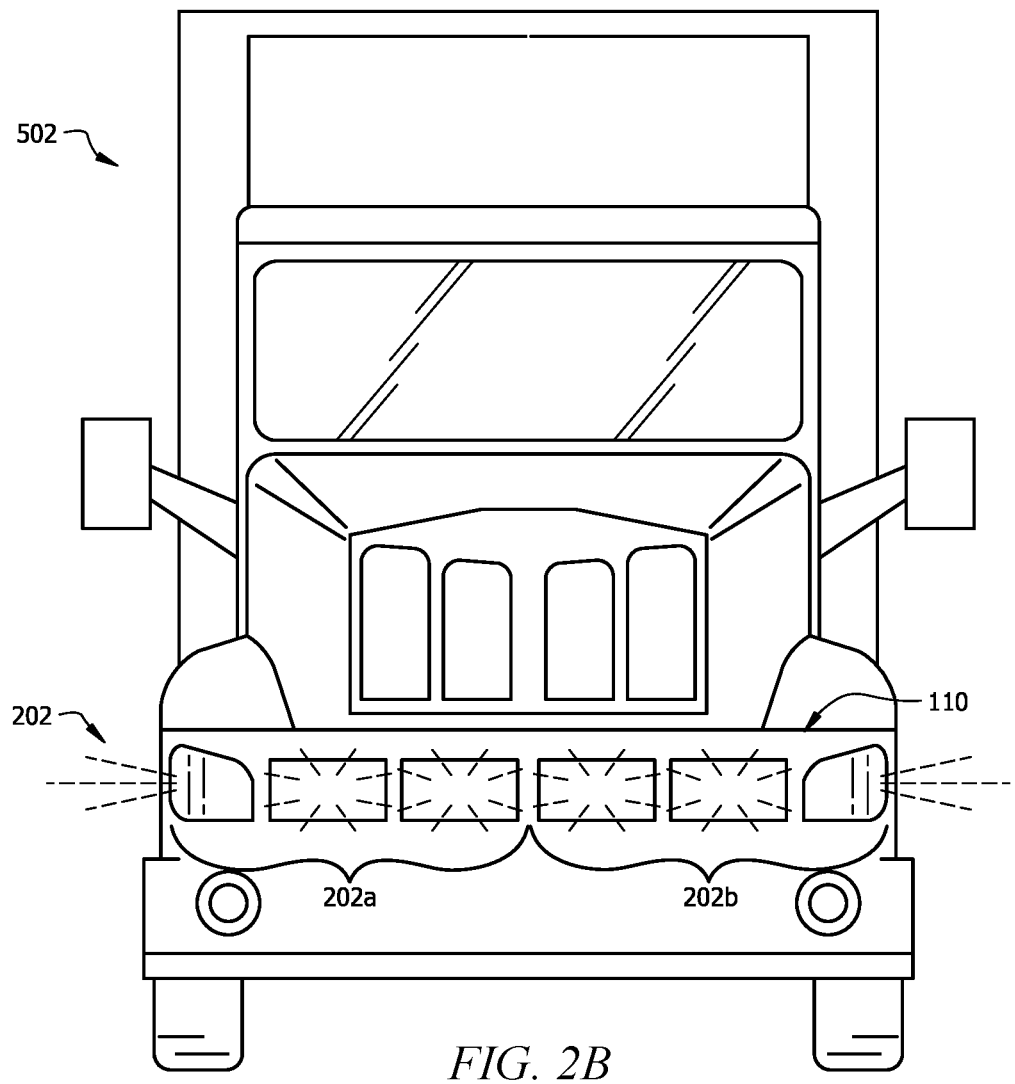

FIGS. 2A and 2B illustrate example embodiments of a headlight 110. FIG. 2A illustrates one embodiment of the headlight 110 where right light sources 202a and left light sources 202b of the headlight 110 are separated. For example, the right light sources 202a and left light sources 202b of the headlight 110 may be implemented in distinct devices. FIG. 2B illustrates another embodiment of the headlight 110 where the headlight 110 comprises a strip of light sources 202 from one side of the autonomous vehicle 502 to another side. For example, the strip of light sources 202 of the headlight 110 may comprise right light sources 202a and left light sources 202b of the headlight 110. In the example of FIG. 2B, the headlight 110 comprises of six sections. Each section of the headlight 110 may comprise one or more light sources 202. Although, in FIG. 2B, each of the right and left light sources 202a and 202b are illustrated to have three sections, the present disclosure contemplates that each of the right and left light sources 202a and 202b can have any number of sections. Any number and combination of the light source 202 may be LEDs, light bulbs, IR LEDs, infrared light emitters, among other light sources. Each light source 202 can be controlled to emit high beam and low beam light.

Operational Flow for Determining an Illumination Level of a Traveling Path of an Autonomous Vehicle FIG. 3 illustrates an example of an operational flow 300 of system 100 of FIG. 1 for determining an illumination level 340 of a traveling path of an autonomous vehicle 502. The operational flow 300 may begin when the control device 550 obtains information 310. The information 310 may comprise one or more of road curvature indication data 310a, time data 310b, location data 310c, light sensor data 310d, light condition level 316a, images 310e, light condition level 316b, infrared images 310f, light condition level 316c, rain sensor data 310g, and rainfall level 320, among others.

Obtaining Road Curvature Indication Data

The road curvature indication data 310a may be detected by a vehicle control subsystem 548. The vehicle control subsystem 548 is described in detail in FIG. 5. In brief, the vehicle control subsystem 548 may include hardware and/or software modules that are configured to control autonomous driving of the autonomous vehicle 502. For example, the vehicle control subsystem 548 may control throttle, gears, brakes, steering, and turn signals.

With respect to turn signals, if the autonomous vehicle 502 approaches a turn or a curved road, the vehicle control subsystem 548 may activate (e.g., turn on) the corresponding turn signal. For example, if the autonomous vehicle 502 approaches a left turn (e.g., the road ahead of the autonomous vehicle 502 turns or curves to the left), the vehicle control subsystem 548 may turn on the left turn signal. In another example, if the autonomous vehicle 502 approaches a right turn (e.g., the road ahead of the autonomous vehicle 502 curves to the right), the vehicle control subsystem 548 may turn on the right turn signal.

The activated turn signal may be included in the road curvature indication data 310a. Thus, the road curvature indication data 310a may include data indicating the status of turn signals, such as, which turn signal (e.g., left or right) is turned on and which turn signal is off. In some examples, the road curvature indication data 310a may include data indicating high beam and/or low beam of turn signals that are turned on.

The control device 550 may determine the status of the turn signals from the road curvature indication data 310a at the light status detection stage 312a. For example, the control device 550 may analyze the road curvature indication data 310a by signal processing to determine the status of turn signals from the road curvature indication data 310a. The control device 550 may communicate the road curvature indication data 310a to the light control fusion module 330. The light control fusion module 330 may use this information to determine the illumination level 340 of a traveling path of the autonomous vehicle 502. This process is described further below in conjunction with the description of the light control fusion module 330.

Determining a Light Condition Level from Time Data

The time data 310b may be detected from the network 112. The network 112 may generally represent the Internet. The control device 550 may obtain the current time from the network 112. For example, the control device 550 may determine a location (e.g., global positioning system (GPS) location) of the autonomous vehicle 502 and a corresponding time zone, and determine the current time. Thus, the time data 310b may include the current time. For example, the time data 310b may indicate that the current time is 9 am, 1 pm, etc.

At the time-based light status detection stage 312b, the control device 550 may determine the environment illumination status at the current time and at the current location of the autonomous vehicle 502. At the time-based light status detection stage 312b, the environment illumination status may be determined based on what is expected at a particular time and location. For example, the control device 550 may determine that the environment illumination status around the autonomous vehicle 502 indicates that the surrounding illumination level is at a particular level (e.g., 15%, 20%, or any other illumination level). For example, the control device 550 may determine that the environment illumination status around the autonomous vehicle 502 indicates that it is nighttime (e.g., the surrounding illumination level is 15%). The control device 550 may communicate the time data 310b to the light control fusion module 330. The light control fusion module 330 may use this information to determine the illumination level 340 of a traveling path of the autonomous vehicle 502 (e.g., the actual illumination level 340 of the traveling path of the autonomous vehicle 502). This process is described further below in conjunction with the description of the light control fusion module 330.

Determining a Light Condition Level from Location Data

The location data 310c may be detected by a GPS sensor 546g. The GPS sensor 546g is described in FIG. 5. In brief, the GPS sensor 546g may be configured to determine the GPS location of the autonomous vehicle 502. Thus, the location data 310c may include the current GPS location of the autonomous vehicle 502. For example, the location data 310c may include the current GPS location coordinates of the autonomous vehicle 502. The location data 310c may be updated as the autonomous vehicle 502 travels.

At the location-based light status detection stage 312c, the control device 550 may determine an expected environment illumination status around the autonomous vehicle 502 based on the current GPS location of the autonomous vehicle 502 from the location data 310c. The control device 550 may communicate the location data 310c to the light control fusion module 330. The light control fusion module 330 may use this information to determine the illumination level 340 of a traveling path of the autonomous vehicle 502. This process is described further below in conjunction with the description of the light control fusion module 330.

In an example scenario, assume that the autonomous vehicle 502 is approaching a tunnel 104 (see FIG. 1). The control device 550 may determine the location of the autonomous vehicle 502 from the location data 310c. The control device 550 may compare the location of the autonomous vehicle 502 with the map data 142 (see FIG. 1). The map data 142 may include locations and types of roads travelled by the autonomous vehicle 502, a road that the autonomous vehicle 502 is on, and roads in a vicinity of the autonomous vehicle 502 (e.g., within a threshold radius from the autonomous vehicle 502). The control device 550 may determine that the autonomous vehicle 502 is approaching the tunnel 104 (see FIG. 1) based on the comparison between the location of the autonomous vehicle 502 and the map data 142 (see FIG. 1). In response, the control device 550 may turn on the headlight 110 before the autonomous vehicle 502 enters the tunnel 104 (see FIG. 1). For example, the control device 550 may turn on high beam light sources and/or high beam infrared light sources of the headlight 110, if no oncoming traffic is detected inside the tunnel 104 (see FIG. 1). In another example, the control device 550 may turn on low beam light sources and/or low beam infrared light sources of the headlight 110, if oncoming traffic is detected inside the tunnel 104 (see FIG. 1).

The control device 550 may adjust the intensity of the light sources (e.g., infrared and/or optical light sources) of the headlight 110 based on feedback that indicates the illumination level 340 of at least a portion of the traveling path of the autonomous vehicle 502 needs to be increased until it is determined that the illumination level 340 of the traveling path of the autonomous vehicle 502 is more than a threshold illumination level 342. In one example, the feedback may be determined from the quality of images 310e (e.g., image quality 132), the quality of infrared images 310f (e.g., infrared image quality 136), the light condition levels 316b of the images 310e, and the light condition levels 316c of the infrared images 310f that are captured after the initial increase of the intensity of the light sources of the headlight 110. In the same or another example, the feedback may be determine from a light condition level 316a detected from light sensor data 310d captured after the initial increase of the intensity of the light sources of the headlight 110. This process is described further below in conjunction with the description of the light control fusion module 330. The image quality 132 may indicate whether objects shown in the image 310e can adequately be recognized by the object detection machine learning module 140. For example, if less than a threshold number of objects shown in the image 310e are not recognized by the object detection machine learning module 140, the control device 550 may determine that the quality of the image 310e is low (e.g., less than 60%, etc.) and less than a threshold image quality 134 (e.g., 70%, etc.). The infrared image quality 136 may indicate whether objects shown in the infrared image 310f can adequately be recognized by the object detection machine learning module 140. For example, if less than a threshold number of objects shown in the infrared image 310f are not recognized by the object detection machine learning module 140, the control device 550 may determine that the quality of the infrared image 310f is low (e.g., less than 60%, etc.) and less than a threshold infrared image quality 138 (e.g., 70%, etc.).

Similarly, when the autonomous vehicle 502 is exiting the tunnel 104 (see FIG. 1), the control device 550 may determine that the autonomous vehicle 502 is exiting the tunnel 104 (see FIG. 1) based on a comparison between the current location of the autonomous vehicle 502 and the map data 142 (see FIG. 1). In response, the control device 550 may turn off the light sources and/or infrared light sources of the headlight 110 after the autonomous vehicle 502 exits the tunnel 104 (see FIG. 1).

Determining a Light Condition Level from Light Sensor Data

The light sensor data 310d may be detected by light sensors 546k. The light sensor 546k is described in FIG. 5. In brief, the light sensor 546k may include a photoelectric device that may be configured to detect a light condition level within its detection range. The light sensor 546k may be configured to convert light energy (e.g., photon) into electrical signals. The amplitude of the electrical signal may be proportional to the detected light energy. As the light sensor 546k detects a more intense light energy flux, the amplitude of the electrical signal may be higher. The light sensor 546k may determine a light condition level 316a of its surroundings based on the generated electrical signal. Examples of the light sensors 546k may include a photoresistor, a light-dependent resistor, a photodiode, a phototransistor, and/or any other device that is configured to convert light into an electrical signal.

In certain embodiments, multiple light sensors 546k may be associated with the autonomous vehicle 502. For example, a first set of light sensors 546k may be located in front of the autonomous vehicle 502, a second set of light sensors 546k may be located on the back of the autonomous vehicle 502, a third set of light sensors 546k may be located on a left side of the autonomous vehicle 502, and a fourth set of light sensors 546k may be located on a right side of the autonomous vehicle 502. Each set of light sensors 546k may be located adjacent to a corresponding camera 546a and/or infrared camera 546j. For example, the light sensors 546k that are located in front of the autonomous vehicle 502 may be located adjacent to front cameras 546a and/or front infrared cameras 546j, and so on.

To determine a light condition level 316a of a road that the autonomous vehicle 502 is on, light sensor data 310d that is captured by the front light sensors 546k may be used. The light condition level 316a detected by the light sensors 546k may represent how much light energy the light sensors 546k detect. The light condition level 316a may be the output of the light sensors 546k. The light sensor data 310d may include the light condition level 316a detected by the light sensors 546k. The light condition level 316a may be represented in a percentage format, such as 0%, 10%, 15%, etc.

At the illumination-based light status detection stage 312d, the control device 550 may determine the light condition level 316a indicated in the light sensor data 310d. In an example scenario, assume that the autonomous vehicle 502 is traveling along a road. The control device 550 may determine that at least a portion of a road (that the autonomous vehicle 502 is on) should be illuminated if the light condition level 316a of the portion of the road (determined from the light sensor data 310d) is determined to be less than a threshold light condition level (e.g., 50%, 70%, or any other suitable value). In another word, the control device 550 may determine that the portion of the road is dark.

The control device 550 may communicate the light sensor data 310d to the light control fusion module 330. The light control fusion module 330 may use this information to determine the illumination level 340 of a traveling path of the autonomous vehicle 502. This process is described further below in conjunction with the description of the light control fusion module 330.

Determining a Light Condition Level from Images

The images 310e may be captured by the cameras 546a. The cameras 546a are described in FIG. 5. In brief, each camera 546a may generally include any device that is configured to capture images and/or videos 310e of its surrounding environment. Examples of the cameras 546a may include digital cameras, video cameras, webcams, and/or any other types of cameras. Each camera 546a may communicate captured images and/or videos 310e to the control device 550 for processing. In this disclosure, the images and videos 310e may collectively be referred to as images 310e. The images 310e may include images of one or more portions of the road that the autonomous vehicle 502 is on.

At image-based light status detection stage 312e, the control device 550 may determine a light condition level 316b of each image 310e. In certain embodiments, the control device 550 may determine the light condition level 316b of an image 310e based on colors of pixels of the image 310e. In this operation, the control device 550 may determine colors of pixels of the image 310e, e.g., by an image processing algorithm implemented by the control device 550 executing the software instructions 128 (see FIG. 1).

The control device 550 may determine the light condition level 316b of the image 310e based on a percentage of the pixels of the image 310e that are black such that the light condition level 316b of the image 310e may be inversely proportional to the percentage of the black pixels of the image 310e. For example, as the percentage of black pixels of the image 310e increases, the control device 550 may determine that the light condition level 316b of the image 310e decreases.

In an example scenario, if it is determined that more than a threshold percentage of the pixels (e.g., more than 50%, 55%, etc.) of the image 310e of the traveling path of the autonomous vehicle 502 are black, the control device 550 may determine that the traveling path of the autonomous vehicle 502 should be illuminated.

In certain embodiments, the control device 550 may determine a light condition level 316b of an image 310e by implementing a light detection algorithm 314. The light detection algorithm 314 may be configured to detect a light condition level 316b of an image 310e. For example, the light detection algorithm 314 may include a support vector machine, a neural network, a random forest, a k-means clustering, an image processing algorithm, etc. In other examples, the light detection algorithm 314 may include, but is not limited to, a multi-layer perceptron, a recurrent neural network (RNN), an RNN long short-term memory (LSTM), a convolution neural network (CNN), a transformer, or any other suitable type of neural network model.

The light detection algorithm 314 may be trained by a training dataset that comprises a set of images labeled with various light condition levels 316b. The light detection algorithm 314 may be trained to learn the association between each image in the training dataset (e.g., training image) and its corresponding light condition level 316b. In this process, the light detection algorithm 314 may feed the training image to a neural network and extract features from the training image, such as brightness, contrast, shadows, and/or other aspects of the training image. The light detection algorithm 314 may learn to associate the extracted features to the light condition level 316b labeled to the training image. In the testing stage, the light detection algorithm 314 may be given another image from the training dataset (e.g., testing image) without its light condition level 316b and asked to predict the light condition level 316b of the testing image. The light detection algorithm 314 may extract the features of the testing image, similar to that described above. The light detection algorithm 314 may compare the features of the testing image with features of training images. The light detection algorithm 314 may predict that the testing image has the same (or similar) light condition level 316b as a training image that has matching (or corresponding) features compared to the testing image. In this manner, the control device 550 (via the light detection algorithm 314) may determine the light condition level 316b of the images 310e.

The control device 550 may communicate the images 310e and the light condition level 316b to the light control fusion module 330. The light control fusion module 330 may use this information to determine the illumination level 340 of a traveling path of the autonomous vehicle 502. This process is described further below in conjunction with the description of the light control fusion module 330.

Determining a Light Condition Level from Infrared Images

The infrared images 310f may be captured by the infrared cameras 546j. The infrared cameras 546j is described in FIG. 5. In brief, each infrared camera 546j may generally include any device that is configured to capture infrared images and/or infrared videos 310f of its surrounding environment. Examples of the infrared cameras 546j may include digital cameras, thermal cameras, and the like. An infrared image 310f (or an infrared video) may show temperatures of objects in different colors. For example, a color of an object shown in an infrared image 310f may represent a temperature of the object. Each infrared camera 546j may communicate captured infrared images and/or videos 310f to the control device 550 for processing. In this disclosure, infrared images and/or videos 310f may collectively be referred to as infrared images 310f. The infrared images 310f may include infrared images of one or more portions of the road which the autonomous vehicle 502 is on.

At infrared image-based light status detection stage 312f, the control device 550 may determine a light condition level 316c of each infrared image 310f, similar to that described above with respect to determining the light condition level 316b of an image 310e.

In certain embodiments, the control device 550 may determine the light condition level 316c of an infrared image 310f based colors of pixels of the infrared image 310f. In this operation, the control device 550 may determine colors of pixels of the infrared image 310f, e.g., by an infrared image processing algorithm implemented by the control device 550 executing the software instructions 128 (see FIG. 1).

The control device 550 may determine the light condition level 316c of the infrared image 310f based on a percentage of the pixels o the infrared image 310f that are black such that the light condition level 316c of the infrared image 310f is inversely proportional to the percentage of black pixels of the infrared image 310f. For example, as the percentage of black pixels of the infrared image 310f increases, the control device 550 may determine that the light condition level 316c of the infrared image 310f decreases. In an example scenario, if it is determined that more than a threshold percentage of the pixels (e.g., more than 50%, 55%, etc.) of the infrared image 310f of the traveling path of the autonomous vehicle 502 are black, the control device 550 may determine that the traveling path of the autonomous vehicle 502 should be illuminated.

In certain embodiments, the control device 550 may determine a light condition level 316c of an infrared image 310f by implementing a light detection algorithm 318. The light detection algorithm 318 may be configured to detect a light condition level 316c of an infrared image 310f. For example, the light detection algorithm 318 may include, but is not limited to, a support vector machine, a neural network, a random forest, a k-means clustering, an image processing, etc. In other examples, the light detection algorithm 318 may include, but is not limited to, a multi-layer perceptron, a RNN, an RNN LSTM, a CNN, a transformer, or any other suitable type of neural network model.

The light detection algorithm 318 may be trained by a training dataset that comprises a set of infrared images labeled with various light condition levels 316c. The light detection algorithm 318 may be trained to learn the association between each infrared image in the training dataset (e.g., training infrared image) and its corresponding light condition level 316c. In this process, the light detection algorithm 318 may feed the training infrared image to a neural network and extract features from the training infrared image, such as brightness, contrast, shadows, and/or other aspects of the training infrared image. The light detection algorithm 318 may learn to associate the extracted features to the light condition level 316c labeled to the training infrared image. In the testing stage, the light detection algorithm 318 may be given another infrared image from the training dataset (e.g., testing infrared image) without its light condition label and asked to predict the light condition level 316c of the testing infrared image. The light detection algorithm 318 may extract the features of the testing infrared image, similar to that described above. The light detection algorithm 318 may compare the features of the testing infrared image with features of training infrared images. The light detection algorithm 318 may predict that the testing infrared image has the same (or similar) light condition level 316c as a training infrared image that has matching (or corresponding) features compared to the testing infrared image. In this manner, the control device 550 (via the light detection algorithm 318) may determine the light condition level 316c of the infrared images 310f.

The control device 550 may communicate the infrared images 310f and the light condition level 316c to the light control fusion module 330. The light control fusion module 330 may use this information to determine the illumination level 340 of a traveling path of the autonomous vehicle 502. This process is described further below in conjunction with the description of the light control fusion module 330.

Determining a Light Condition Level from Rain Sensor Data

The rain sensor data 310g may be captured by rain sensors 546i. The rain sensor 546i is described in FIG. 5. In brief, each rain sensor 546i may include a liquid sensing module, and is generally configured to sense a liquid level (e.g., moisture level, raindrops) on a housing of the rain sensor 546i or within its surroundings. At least a portion of the housing of the rain sensor 546i may be a sensing area of the rain sensor 546i, such that the rain sensor 546i may be able to detect the liquid level on the sensing area. Examples of the rain sensors 546i may include a capacitive-based sensor, an optical sensor, infrared-based sensor, and/or any other type of sensor that can detect liquid levels on its sensing area or within its surroundings.

The capacitive-based rain sensor 546i may be configured to detect a liquid level on its sensing area by determining a difference in the capacitance detected from the sensing area before and after moisture (such as raindrops) is added on the sensing area.

The optical rain sensor 546i may be configured to detect a liquid level by determining a difference in transmitted and reflected optical signals (e.g., laser beams) before and during rain. The infrared-based rain sensor 546i may be configured to detect a liquid level by determining a difference in transmitted and reflected infrared signals before and during rain. For example, the difference in transmitted and reflected infrared signals before and during rain may include frequency change, phase signal change, and energy (e.g., power level, intensity) change between the transmitted and reflected infrared signals.

The rain sensor data 310g may indicate a detected liquid level, e.g., due to rain. The control device 550 may determine a rainfall level 320 based on the rain sensor data 310g. For example, the rainfall level may be represented in a percentage format, e.g., 10%, 20%, etc.

In an example scenario, assume that the autonomous vehicle 502 is traveling along a road while it is raining. The control device 550 may determine a rainfall level 320 based on the rain sensor data 310g. The control device 550 may determine that the traveling path (e.g., at least a portion of the road which the autonomous vehicle 502 is on) should be illuminated if it is determined that the rain sensor data 310g indicates that the rainfall level 320 is greater than a threshold rainfall level, e.g., more than 40%, 45%, etc.

The control device 550 may communicate the rain sensor data 310g and the rainfall level 320 to the light control fusion module 330. The light control fusion module 330 may use this information to determine the illumination level 340 of a traveling path of the autonomous vehicle 502. This process is described further below in conjunction with the description of the light control fusion module 330.

Determining Whether the Traveling Path of the Autonomous Vehicle should be Illuminated The control device 550 may implement the light control fusion module 330 by the processor 122 executing the software instructions 128. The light control fusion module 330 may include a hardware and/or software module, and is generally configured to determine an illumination level 340 of at least a portion of the traveling path of the autonomous vehicle 502 based on the information 310 and determine whether the traveling path of the autonomous vehicle 502 should be illuminated based on the information 310. The illumination level 340 may indicate how much light is in the environment in the traveling path of the autonomous vehicle 502.

In one embodiment, the light control fusion module 330 may determine that the traveling path of the autonomous vehicle 502 should be illuminated if the determined illumination level 340 of the traveling path is less than the threshold illumination level 342, e.g., 40%, 45%, etc.

In one embodiment, the light control fusion module 330 may determine the illumination level 340 based on the information 310. For example, the light control fusion module 330 may determine the illumination level 340 of any suitable number and combination of factors associated with at least a portion of the traveling path of the autonomous vehicle 502 based on, for example: 1) the current time at the location of the autonomous vehicle 502 indicated in the time data 310b (e.g., 9 am); 2) the location of the autonomous vehicle 502 indicated in the location data 310c (e.g., the autonomous vehicle 502 is approaching a tunnel); 3) the light condition level 316a indicated in the light sensor data 310d (e.g., 65%); 4) the light condition level 316b detected from the images 310e of the traveling path (e.g., 70%); and 5) the light condition level 316c detected from the infrared images 310f of the traveling path (e.g., 73%). In one embodiment, the light control fusion module 330 may determine the illumination level 340 by determining a mean of the light condition levels 316a to 316c. The current time and location of the autonomous vehicle 502 may be used to determine the accuracy (e.g., confidence level) of the illumination level 340.

In one embodiment, if it is determined that the traveling path of the autonomous vehicle 502 should be illuminated, the control device 550 may adjust the headlight 110 to illuminate the traveling path. For example, if the information 310 indicates that 1) the current time is nighttime; and/or 2) the autonomous vehicle 502 is approaching a tunnel; and/or 3) a light condition level 316b of an image 310e is less than a threshold light condition level; and/or 4) a light condition level 316c of an infrared image 310f is less than a threshold light condition level; and/or 5) a light condition level 316a indicted in the light sensor data 310d is less than a threshold light condition level, the control device 550 may adjust the headlight 110 to illuminate the traveling path.

In one embodiment, if the determined illumination level 340 is less than the threshold illumination level 342, the control device 550 may adjust the headlight 110 to illuminate the traveling path. Example scenarios in which the control device 550 adjusts the headlight 110 are described below.

In an example scenario, with respect to the road curvature indication data 310a, if the control device 550 determines that the road curvature indication data 310a indicates that the autonomous vehicle 502 is approaching a left turn (e.g., the road ahead of the autonomous vehicle 502 curves to the left), the light control fusion module 330 may determine that left-side light sources and/or left-side infrared light sources of the headlight 110 may need to be turned on. In response, the control device 550 may adjust the headlight 110 by turning on a left-side light sources and/or left-side infrared light sources of the headlight 110 (e.g., light sources 202b (see FIGS. 2A and 2B)).

In another example scenario, with respect to the time data 310b, if the time data 310b indicates that the current time is nighttime (e.g., 9 pm), the light control fusion module 330 may determine that front light sources and/or front infrared light sources of the headlight 110 may need to be turned on. In response, the control device 550 may adjust the headlight 110 by turning on the front light sources and/or front infrared light sources of the headlight 110.

In another example scenario, with respect to the location data 310c, if the location data 310c indicates that the autonomous vehicle 502 is approaching a tunnel (e.g., tunnel 104 of FIG. 1), the light control fusion module 330 may determine that the front high beam light sources and/or front high beam infrared light sources of the headlight 110 may need to be activated. In response, the control device 550 may turn on the front high beam light sources and/or front high beam infrared light sources of the headlight 110 before the autonomous vehicle 502 enters the tunnel.

In another example scenario, with respect to the light sensor data 310d, if the light sensor data 310d indicates that the environment light surrounding the autonomous vehicle 502 is low (e.g., 20%, 25%), the light control fusion module 330 may determine that one or more light sources of the headlight 110 (e.g., low beam, high beam, optical light sources, infrared light sources) may need to be activated. In response, the control device 550 may activate the one or more light sources of the headlight 110.

In another example scenario, with respect to the images 310e, if the light condition level 316b of the images 310e is determined to be less than a threshold light condition level (e.g., less than 70%, 75%, etc.), the light control fusion module 330 may determine that one or more light sources of the headlight 110 (e.g., low beam, high beam, optical light sources, infrared light sources) may need to be activated. In response, the control device 550 may activate the one or more light sources of the headlight 110.

In another example scenario, with respect to the infrared images 310f, if the light condition level 316c of the infrared images 310f is determined to be less than a threshold light condition level (e.g., less than 70%, 75%, etc.), the light control fusion module 330 may determine that one or more light sources of the headlight 110 (e.g., low beam, high beam, optical light sources, infrared light sources) may need to be activated. In response, the control device 550 may activate the one or more light sources of the headlight 110.

In another example scenario, if it is determined that the light sensor data 310d indicates that the light condition level of the environment around the autonomous vehicle 502 is less than a threshold light condition level (e.g., less than 70%, 75%, etc.), and/or if it is determined that the time data 310b indicates that the current time is nighttime, and/or if it is determined that the driving instructions 148 request front light assist from the control device 550, the light control fusion module 330 may determine that front low beam light sources or front high light sources of the headlight 110 may need to be turned on (depending on the opposite traffic such that if oncoming traffic is detected by analyzing the sensor data 130, low beam light sources may be turned on, and if no oncoming traffic is detected by analyzing the sensor data 130, high beam light sources may be turned on).

The light control fusion module 330 may further determine that front infrared light sources of the headlight 110 may need to be turned on. The control device 550 (via the light control fusion module 330) may adjust the intensity of the front infrared sources based on the quality of the infrared images 310f and light condition level 316c determined from the infrared images 310f. For example, if the light condition level 316c of the infrared images 310f is less than a threshold light condition level (e.g., less than 70%, 75%, etc.), the control device 550 may increase the intensity of the front infrared sources until the light condition level 316c of the infrared images 310f is more than the threshold light condition level. An example pseudocode of this example scenario may be as follows:

If (the light condition level < the threshold light condition level; and/or current time == nighttime; and/or front light assist request received ==yes) {
    If (oncoming traffic detected == yes) {
      Turn on low beam front light sources; }
    Else if (oncoming traffic detected == no) {
      Turn on high beam front light sources; }
    Turn on front infrared light sources;
    Adjust the intensity of the front infrared light sources based on infrared image quality and light condition level determined from the infrared images; }

In another example scenario, 1) if it is determined that the light sensor data 310*d* indicates that the light condition level 316*a* of the traveling path of the autonomous vehicle 502 is less than a threshold light condition level (e.g., less than 70%, 75%, etc.), and/or if it is determined that the time data 310*b* indicates that the current time is nighttime, and 2) if it is determined that the location data 310*c* indicates that the autonomous vehicle 502 is approaching a particular turn (e.g., left or right turn) and/or the driving instructions 148 request side light assist from the control device 550, the light control fusion module 330 may determine that the side light sources of the headlight 110 may need to be turned on. The light control fusion module 330 may further determine that side infrared light sources of the headlight 110 may need to be turned on.

The control device 550 (via the light control fusion module 330) may adjust the intensity of the side infrared light sources based on the quality of the infrared images 310*f* and light condition level 316*c* determined from the infrared images 310*f*. For example, if the light condition level 316*b* of the infrared images 310*f* is less than a threshold light condition level (e.g., less than 70%, 75%, etc.), the control device 550 may increase the intensity of the side infrared sources until the light condition level 316*b* of the infrared images 310*f* is more than the threshold light condition level. An example pseudocode of this example scenario may be as follows:

```
If (the light condition level < the threshold light condition level; and/or current time ==
nighttime ) {
    If (the autonomous vehicle approaching a turn == yes; and/or the side light assist
request received == yes) {
        Turn on side light sources;
        Turn on side infrared light sources;
        Adjust the intensity of the side infrared light sources based on infrared
image quality and light condition level determined from the infrared images; } }
```

In any of the example scenarios described above, if the control device 550 detects oncoming traffic, e.g., by analyzing the sensor data 130 (see FIG. 1), the control device 550 may determine that high beam light sources of the headlight 110 may need to be turned off, and infrared light sources of the headlight 110 may need to be turned on. The control device 550 may also determine that low beam light sources and/or low beam infrared light sources of the headlight 110 may need to be turned on depending on an encountered scenario.

In any of the example scenarios described above, the control device 550 may adjust the intensity of the activated light source from 0% to 100% according to the comparison between the illumination level 340 and the threshold illumination level 342, light condition levels 316*a* to 316*c*, and the quality of the images 310*e* and/or infrared images 310*f*. The quality of an image 310*e* and/or infrared image 310*f* may indicate whether objects shown in the image 310*e* and/or infrared image 310*f* can be adequately recognized by the object detection machine learning module 140.

In some embodiments, the object detection machine learning module 140 may determine the current illumination status of at least a portion of a road the autonomous vehicle 502 is traveling on. For example, whether the headlight 110 is on or off, the object detection machine learning module 140 may determine the current illumination status of at least a portion of a road based on the image quality 132 of images 310*e* and/or infrared image quality 136 of infrared images 310*f*. This information may be used as an additional information in adjusting the headlights 110 in conjunction with other information obtained from the sensors 546, network 112, vehicle control subsystem 548, similar to that described above.

Figure 4:
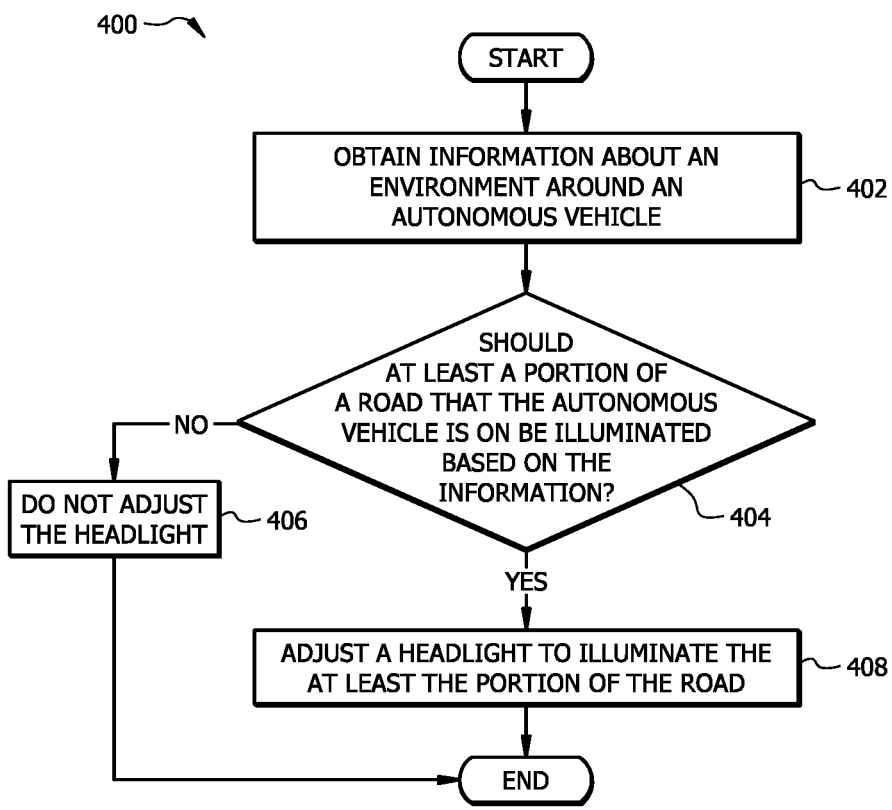
FIG. 4 illustrates an embodiment of a method for implementing an adaptive illumination system for an autonomous vehicle.

Example Method to Implement an Adaptive Illumination System for an Autonomous Vehicle FIG. 4 illustrates an example flowchart of a method 400 for implementing an adaptive illumination system for an autonomous vehicle 502. Modifications, additions, or omissions may be made to method 400. Method 400 may include more, fewer, or other operations. For example, operations may be performed in parallel or in any suitable order. While at times discussed as the autonomous vehicle 502, control device 550, or components of any of thereof performing operations, any suitable system or components of the system may perform one or more operations of the method 400. For example, one or more operations of method 400 may be implemented, at least in part, in the form of software instructions 128 and processing instructions 580, respectively, from FIGS. 1 and 5, stored on non-transitory, tangible, machine-readable media (e.g., memory 126 and data storage 590, respectively, from FIGS. 1 and 5) that when run by one or more processors (e.g., processors 122 and 570, respectively, from FIGS. 1 and 5) may cause the one or more processors to perform 402-408.

Method 400 may begin at 402 where the control device 550 may obtain information 310 about an environment around an autonomous vehicle 502. The information 310 may comprise one or more of road curvature indication data 310*a*, time data 310*b*, location data 310*c*, light sensor data 310*d*, light condition level 316*a*, images 310*e*, light condition level 316*b*, infrared images 310*f*, light condition level 316*c*, rain sensor data 310*g*, and rainfall level 320. The control device 550 may obtain the information 310 from one or more of vehicle control subsystem 548, network 112, GPS sensor 546*g*, light sensors 546*k*, cameras 546*a*, infrared cameras 546*j*, and rain sensors 546*i*, similar to that described in FIG. 3.

At 404, the control device 550 may determine whether at least a portion of a road that the autonomous vehicle 502 is on should be illuminated based at least on the information 310. In this process, the control device 550 may determine the illumination level 340 of at least the portion of the road that the autonomous vehicle 502 is on (e.g., traveling path of the autonomous vehicle 502), similar to that described in the operational flow 300 of FIG. 3. For example, the control device 550 may determine how much or how little the at least portion of the road (e.g., traveling path of the autonomous vehicle 502) should be illuminated if the information 310 indicates that an illumination level 340 of at least the portion of the road is less than a threshold illumination level 342. Other example scenarios in which the control device 550 may determine whether the at least portion of the road should be illuminated based on the information 310 are described in FIGS. 1 and 3. If it is determined that the at least portion of the road should be illuminated, method 400 may proceed to 408. Otherwise, method 400 may proceed to 406.

At 406, the control device 550 may not adjust the headlight 110 associated with the autonomous vehicle 502.

At 408, the control device 550 may adjust the headlight 110 to illuminate at least the portion of the road that the autonomous vehicle 502 is on.

For example, with respect to an image 310e of traveling path of the autonomous vehicle 502, the control device 550 may determine a light condition level 316a of the image 310e. If the control device 550 determines that the light condition level 316a is less than a threshold light condition level 150 (e.g., less than 70%, 65%, etc.), the control device 550 may adjust the headlight 110 to increase the illumination level 340 of at least a portion of the traveling path of the autonomous vehicle 502 until the light condition level 316a becomes at least equal to the threshold light condition level 150. For example, the control device 550 may increase the intensity of the light sources of the headlight 110 until the light condition level 316a (of the future images 310e captured after the initial adjustment of the headlight 110) becomes at least equal to the threshold light condition level. Additionally or alternatively, the control device 550 may adjust the headlight 110 to increase the illumination level 340 of at least a portion of the traveling path of the autonomous vehicle 502 until the illumination level 340 becomes at least equal to the threshold illumination level 342.

In another example, with respect to an infrared image 310f of the traveling path of the autonomous vehicle 502, the control device 550 may determine a light condition level 316c of the infrared image 310f. If the control device 550 determined that the light condition level 316c is less than a threshold light condition level 150 (e.g., less than 70%, 65%, etc.), the control device 550 may adjust the headlight 110 to increase the illumination level 340 of at least a portion of the traveling path of the autonomous vehicle 502 until the light condition level 316c becomes at least equal the threshold light condition level 150.

For example, the control device 550 may increase the intensity of the infrared light sources of the headlight 110 until the light condition level 316c (of future infrared images 310f captured after the initial adjustment of the headlight 110) becomes at least equal to the threshold light condition level. Additionally or alternatively, the control device 550 may adjust the headlight 110 to increase the illumination level 340 of at least a portion of the traveling path of the autonomous vehicle 502 until the illumination level 340 becomes at least equal to the threshold illumination level 342. The control device 550 may perform one or more operations described above in a case where the control device 550 receives sensor data 130 and detect a presence of oncoming traffic in the sensor data 130. In response to the oncoming traffic being detected, the control device 550 may turn on one or more of a low beam infrared light source of the headlight 110 and a low beam light source of the headlight 110. The control device 550 may determine the infrared image quality 136 of an infrared image 310f of at least a portion of the traveling path of the autonomous vehicle 502. If the control device 550 determines that the infrared image quality 136 is less than the threshold infrared image quality 138, the control device 550 may increase an intensity of infrared light emitted from the low beam infrared light source of the headlight 110 until the infrared image quality 136 becomes at least equal to the threshold infrared image quality 138. The control device 550 may perform a similar operation with respect to an image 310e of at least a portion of the traveling path of the autonomous vehicle 502. For example, the control device 550 may determine the image quality 132 of an image 310e of the traveling path of the autonomous vehicle 502. If the control device 550 determines that the image quality 132 is less than the threshold image quality 134, the control device 550 may increase an intensity of light emitted from the low beam light source of the headlight 110 until the image quality 132 becomes at least equal to the threshold image quality 134.

In another example, assume that the control device 550 receives sensor data 130 and detects an absence of oncoming traffic from the sensor data 130. In such a case, the control device 550 may turn on one or more high beam infrared light source of the headlight 110 and a high beam light source of the headlight 110. The control device 550 may determine the infrared image quality 136 of an infrared image 310f of at least a portion of the traveling path of the autonomous vehicle 502. If the control device 550 determines that the infrared image quality 136 is less than the threshold infrared image quality 138, the control device 550 may increase an intensity of infrared light emitted from the high beam infrared light source of the headlight 110 until the infrared image quality 136 becomes at least equal to the threshold infrared image quality 138. The control device 550 may perform a similar operation with respect to an image 310e of at least a portion of the traveling path of the autonomous vehicle 502. For example, the control device 550 may determine the image quality 132 of an image 310e of at least a portion of the traveling path of the autonomous vehicle 502. If the control device 550 determines that the image quality 132 is less than the threshold image quality 134, the control device 550 may increase an intensity of light emitted from the high beam light source of the headlight 110 until the image quality 132 becomes at least equal to the threshold image quality 134.

In another example, assume that the information 310 indicates that the illumination level 340 of at least a portion of the traveling path of the autonomous vehicle 502 is less than the threshold illumination level 342. Also, assume that the control device 550 has detected oncoming traffic by analyzing the sensor data 130. In this example, the control device 550 may turn on one or more of a low beam infrared light source and a low beam light source of the headlight 110. The control device 550 may determine a quality of an infrared image 310f (e.g., infrared image quality 136) of at least a portion of the traveling path of the autonomous vehicle 502. The quality of the infrared image 310f may indicate whether objects shown in the infrared image 310f can adequately be recognized by the object detection machine learning module 140. For example, if less than a threshold number of objects shown in the infrared image 310f are not recognized by the object detection machine learning module 140, the control device 550 may determine that the quality of the infrared image 310f is low (e.g., less than 60%, etc.) and less than a threshold infrared image quality 138 (e.g., 70%, etc.). If the control device 550 determines that the quality of the infrared image 310f is less than the threshold infrared image quality 138, the control device 550 may increase the intensity of the infrared light emitted from the low beam infrared light source until the quality of the infrared image 310f becomes at least equal to the threshold infrared image quality 138.

The control device 550 may perform a similar operation with respect to images 310e and increase the intensity of light sources of the headlight 110 until the quality of the image 310e (e.g., image quality 132) becomes at least equal to the threshold image quality 134. The control device 550 may determine a quality of an image 310e (e.g., image quality 132) of at least a portion of the traveling path of the autonomous vehicle 502. The quality of the image 310e may indicate whether objects shown in the image 310e can adequately be recognized by the object detection machine learning module 140. For example, if less than a threshold number of objects shown in the image 310e are not recognized by the object detection machine learning module 140, the control device 550 may determine that the quality of the image 310e is low (e.g., less than 60%, etc.) and less than a threshold image quality 134 (e.g., 70%, etc.).

In another example, assume that the information 310 indicates that the illumination level 340 of at least a portion of the traveling path of the autonomous vehicle 502 is less than the threshold illumination level 342. Also, assume that the control device has determined that there is no oncoming traffic detected from the sensor data 130. In this example, the control device 550 may turn on one or more of a high beam infrared light source and a high beam light source of the headlight 110.

The control device 550 may determine a quality an infrared image 310f of at least a portion of the traveling path of the autonomous vehicle 502, similar to that described above. If the control device 550 determines that the quality of the infrared image 310f is less than the threshold infrared image quality 138, the control device 550 may increase the intensity of the infrared light emitted from the high beam infrared light source until the quality of the infrared image 310f becomes at least equal to the threshold infrared image quality 138. The control device 550 may perform a similar operation with respect to images 310e and increase the intensity of light sources of the headlight 110 until the quality of the image 310e becomes at least equal to the threshold image quality 134.

In another example, assume that the road curvature indication data 310a and/or the location data 310c indicates that the autonomous vehicle 502 is approaching a left turn (e.g., the road ahead of the autonomous vehicle 502 curves to the left). In this example, the control device 550 may turn on one or more of a left-side infrared light source and a left-side light source of the headlight 110 (e.g., light sources 202b (see FIGS. 2A and 2B)). The control device 550 may determine a quality an infrared image 310f of at least a portion of the traveling path of the autonomous vehicle 502, similar to that described above. If the control device 550 determines that the quality of the infrared image 310f is less than a threshold infrared image quality 138, the control device 550 may increase the intensity of the infrared light emitted from the left-side infrared light source until the quality of the infrared image 310f becomes at least equal to the threshold infrared image quality 138. The control device 550 may perform a similar operation with respect to images 310e and increase the intensity of light sources of the headlight 110 until the quality of the image 310e becomes at least equal to the threshold image quality 134.

The control device 550 may perform a similar operation with respect to a case when the autonomous vehicle 502 approaches a right turn (e.g., the road ahead of the autonomous vehicle 502 curves to the left). For example, assume that the information 310 indicates that the illumination level 340 of at least a portion of the traveling path of the autonomous vehicle 502 is less than the threshold illumination data 342. Also, assume that the road curvature indication data 310a and/or the location data 310c indicates that the autonomous vehicle 502 is approaching a right turn. In this example, the control device 550 may turn on one or more of a right-side infrared light source and a right-side light source of the headlight 110 (e.g., light sources 202a (see FIGS. 2A and 2B)). The control device 550 may determine a quality an infrared image 310f of at least a portion of the traveling path of the autonomous vehicle 502, similar to that described above.

If the control device 550 determines that the quality of the infrared image 310f is less than a threshold infrared image quality 138, the control device 550 may increase the intensity of the infrared light emitted from the right-side infrared light source until the quality of the infrared image 310f becomes at least equal to the threshold infrared image quality 138. The control device 550 may perform a similar operation with respect to images 310e and increase the intensity of light sources of the headlight 110 until the quality of the image 310e becomes at least equal to the threshold image quality 134.

Example Autonomous Vehicle and its Operation

FIG. 5 shows a block diagram of an example vehicle ecosystem 500 in which autonomous driving operations can be determined. As shown in FIG. 5, the autonomous vehicle 502 may be a semi-trailer truck. The vehicle ecosystem 500 may include several systems and components that can generate and/or deliver one or more sources of information/data and related services to the in-vehicle control computer 550 that may be located in an autonomous vehicle 502. The in-vehicle control computer 550 can be in data communication with a plurality of vehicle subsystems 540, all of which can be resident in the autonomous vehicle 502. A vehicle subsystem interface 560 may be provided to facilitate data communication between the in-vehicle control computer 550 and the plurality of vehicle subsystems 540. In some embodiments, the vehicle subsystem interface 560 can include a controller area network (CAN) controller to communicate with devices in the vehicle subsystems 540.

The autonomous vehicle 502 may include various vehicle subsystems that support the operation of autonomous vehicle 502. The vehicle subsystems 540 may include a vehicle drive subsystem 542, a vehicle sensor subsystem 544, a vehicle control subsystem 548, and/or network communication subsystem 592. The components or devices of the vehicle drive subsystem 542, the vehicle sensor subsystem 544, and the vehicle control subsystem 548 shown in FIG. 5 are examples. The autonomous vehicle 502 may be configured as shown or any other configurations.

The vehicle drive subsystem 542 may include components operable to provide powered motion for the autonomous vehicle 502. In an example embodiment, the vehicle drive subsystem 542 may include an engine/motor 542a, wheels/tires 542b, a transmission 542c, an electrical subsystem 542d, and a power source 542e.

The vehicle sensor subsystem 544 may include a number of sensors 546 configured to sense information about an environment or condition of the autonomous vehicle 502. The vehicle sensor subsystem 544 may include one or more cameras 546a or image capture devices, a radar unit 546b, one or more temperature sensors 546c, a wireless communication unit 546d (e.g., a cellular communication transceiver), an inertial measurement unit (IMU) 546e, a laser range finder/LiDAR unit 546f, a Global Positioning System (GPS) transceiver 546g, a wiper control system 546h, one or more rain sensors 546i, and/or infrared cameras 546j. The vehicle sensor subsystem 544 may also include sensors configured to monitor internal systems of the autonomous vehicle 502 (e.g., an O2 monitor, a fuel gauge, an engine oil temperature, etc.).

The IMU 546e may include any combination of sensors (e.g., accelerometers and gyroscopes) configured to sense position and orientation changes of the autonomous vehicle 502 based on inertial acceleration. The GPS transceiver 546g may be any sensor configured to estimate a geographic location of the autonomous vehicle 502. For this purpose, the GPS transceiver 546g may include a receiver/transmitter operable to provide information regarding the position of the autonomous vehicle 502 with respect to the Earth. The radar unit 546b may represent a system that utilizes radio signals to sense objects within the local environment of the autonomous vehicle 502. In some embodiments, in addition to sensing the objects, the radar unit 546b may additionally be configured to sense the speed and the heading of the objects proximate to the autonomous vehicle 502. The laser range finder or LiDAR unit 546f may be any sensor configured to use lasers to sense objects in the environment in which the autonomous vehicle 502 is located. The cameras 546a may include one or more devices configured to capture a plurality of images of the environment of the autonomous vehicle 502. The cameras 546a may be still image cameras or motion video cameras. The infrared cameras 546j may include one or more devices configured to capture a plurality of infrared images of the environment of the autonomous vehicle 502. The cameras 546j may be still infrared image cameras or motion video infrared cameras. The rain sensors 546i may include one or more devices configured to detect liquid levels (e.g., raindrops, moisture) on sensing area of the rain sensors 546i.

The vehicle control subsystem 548 may be configured to control the operation of the autonomous vehicle 502 and its components. Accordingly, the vehicle control subsystem 548 may include various elements such as a throttle and gear selector 548a, a brake unit 548b, a navigation unit 548c, a steering system 548d, and/or an autonomous control unit 548e. The throttle and gear selector 548a may be configured to control, for instance, the operating speed of the engine and, in turn, control the speed of the autonomous vehicle 502. The throttle and gear selector 548a may be configured to control the gear selection of the transmission. The brake unit 548b can include any combination of mechanisms configured to decelerate the autonomous vehicle 502. The brake unit 548b can slow the autonomous vehicle 502 in a standard manner, including by using friction to slow the wheels or engine braking. The brake unit 548b may include an anti-lock brake system (ABS) that can prevent the brakes from locking up when the brakes are applied. The navigation unit 548c may be any system configured to determine a driving path or route for the autonomous vehicle 502. The navigation unit 548c may additionally be configured to update the driving path dynamically while the autonomous vehicle 502 is in operation. In some embodiments, the navigation unit 548c may be configured to incorporate data from the GPS transceiver 546g and one or more predetermined maps so as to determine the driving path for the autonomous vehicle 502. The steering system 548d may represent any combination of mechanisms that may be operable to adjust the heading of autonomous vehicle 502 in an autonomous mode or in a driver-controlled mode.

The autonomous control unit 548e may represent a control system configured to identify, evaluate, and avoid or otherwise negotiate potential obstacles or obstructions in the environment of the autonomous vehicle 502. In general, the autonomous control unit 548e may be configured to control the autonomous vehicle 502 for operation without a driver or to provide driver assistance in controlling the autonomous vehicle 502. In some embodiments, the autonomous control unit 548e may be configured to incorporate data from the GPS transceiver 546g, the radar unit 546b, the LiDAR unit 546f, the cameras 546a, and/or other vehicle subsystems to determine the driving path or trajectory for the autonomous vehicle 502.

The network communication subsystem 592 may comprise network interfaces, such as routers, switches, modems, and/or the like. The network communication subsystem 592 may be configured to establish communication between the autonomous vehicle 502 and other systems, servers, etc. The network communication subsystem 592 may be further configured to send and receive data from and to other systems.

Many or all of the functions of the autonomous vehicle 502 can be controlled by the in-vehicle control computer 550. The in-vehicle control computer 550 may include at least one data processor 570 (which can include at least one microprocessor) that executes processing instructions 580 stored in a non-transitory computer-readable medium, such as the data storage device 590 or memory. The in-vehicle control computer 550 may also represent a plurality of computing devices that may serve to control individual components or subsystems of the autonomous vehicle 502 in a distributed fashion. In some embodiments, the data storage device 590 may contain processing instructions 580 (e.g., program logic) executable by the data processor 570 to perform various methods and/or functions of the autonomous vehicle 502, including those described with respect to FIGS. 1-7.

The data storage device 590 may contain additional instructions as well, including instructions to transmit data to, receive data from, interact with, or control one or more of the vehicle drive subsystem 542, the vehicle sensor subsystem 544, and the vehicle control subsystem 548. The in-vehicle control computer 550 can be configured to include a data processor 570 and a data storage device 590. The in-vehicle control computer 550 may control the function of the autonomous vehicle 502 based on inputs received from various vehicle subsystems (e.g., the vehicle drive subsystem 542, the vehicle sensor subsystem 544, and the vehicle control subsystem 548).

FIG. 6 shows an exemplary system 600 for providing precise autonomous driving operations. The system 600 may include several modules that can operate in the in-vehicle control computer 550, as described in FIG. 5. The in-vehicle control computer 550 may include a sensor fusion module 602 shown in the top left corner of FIG. 6, where the sensor fusion module 602 may perform at least four image or signal processing operations. The sensor fusion module 602 can obtain images from cameras located on an autonomous vehicle to perform image segmentation 604 to detect the presence of moving objects (e.g., other vehicles, pedestrians, etc.,) and/or static obstacles (e.g., stop sign, speed bump, terrain, etc.,) located around the autonomous vehicle. The sensor fusion module 602 can obtain LiDAR point cloud data item from LiDAR sensors located on the autonomous vehicle to perform LiDAR segmentation 606 to detect the presence of objects and/or obstacles located around the autonomous vehicle. The sensor fusion module 602 may obtain illumination level 340 (see FIG. 3) from the light control fusion module 330 (see FIG. 3). The sensor fusion module 602 may use the illumination level 340 to perform one or more functions described herein, such as determining a quality of images and infrared images, and detecting objects from images and infrared images.

The sensor fusion module 602 can perform instance segmentation 608 on image and/or point cloud data items to identify an outline (e.g., boxes) around the objects and/or obstacles located around the autonomous vehicle. The sensor fusion module 602 can perform temporal fusion 610 where objects and/or obstacles from one image and/or one frame of point cloud data item are correlated with or associated with objects and/or obstacles from one or more images or frames subsequently received in time.

The sensor fusion module 602 can fuse the objects and/or obstacles from the images obtained from the camera and/or point cloud data item obtained from the LiDAR sensors. For example, the sensor fusion module 602 may determine based on a location of two cameras that an image from one of the cameras comprising one half of a vehicle located in front of the autonomous vehicle is the same as the vehicle captured by another camera. The sensor fusion module 602 may send the fused object information to the tracking and prediction module 646 and the fused obstacle information to the occupancy grid module 660. The in-vehicle control computer may include the occupancy grid module 660 which can retrieve landmarks from a map database 658 stored in the in-vehicle control computer. The occupancy grid module 660 can determine drivable areas and/or obstacles from the fused obstacles obtained from the sensor fusion module 602 and the landmarks stored in the map database 658. For example, the occupancy grid module 660 can determine that a drivable area may include a speed bump obstacle.

Below the sensor fusion module 602, the in-vehicle control computer 550 may include a LiDAR-based object detection module 612 that can perform object detection 616 based on point cloud data item obtained from the LiDAR sensors 614 located on the autonomous vehicle. The object detection 616 technique can provide a location (e.g., in 3D world coordinates) of objects from the point cloud data item. Below the LiDAR-based object detection module 612, the in-vehicle control computer may include an image-based object detection module 618 that can perform object detection 624 based on images obtained from cameras 620 located on the autonomous vehicle. The object detection 618 technique can employ a deep machine learning technique 624 to provide a location (e.g., in 3D world coordinates) of objects from the image provided by the camera 620.

The radar 656 on the autonomous vehicle can scan an area in front of the autonomous vehicle or an area towards which the autonomous vehicle is driven. The radar data may be sent to the sensor fusion module 602 that can use the radar data to correlate the objects and/or obstacles detected by the radar 656 with the objects and/or obstacles detected from both the LiDAR point cloud data item and the camera image. The radar data also may be sent to the tracking and prediction module 646 that can perform data processing on the radar data to track objects by object tracking module 648 as further described below.

The in-vehicle control computer may include an tracking and prediction module 646 that receives the locations of the objects from the point cloud and the objects from the image, and the fused objects from the sensor fusion module 602. The tracking and prediction module 646 may also receive the radar data with which the tracking and prediction module 646 can track objects by object tracking module 648 from one point cloud data item and one image obtained at one time instance to another (or the next) point cloud data item and another image obtained at another subsequent time instance.

The tracking and prediction module 646 may perform object attribute estimation 650 to estimate one or more attributes of an object detected in an image or point cloud data item. The one or more attributes of the object may include a type of object (e.g., pedestrian, car, or truck, etc.).

The tracking and prediction module 646 may perform behavior prediction 652 to estimate or predict motion pattern of an object detected in an image and/or a point cloud. The behavior prediction 652 can be performed to detect a location of an object in a set of images received at different points in time (e.g., sequential images) or in a set of point cloud data item received at different points in time (e.g., sequential point cloud data items). In some embodiments, the behavior prediction 652 can be performed for each image received from a camera and/or each point cloud data item received from the LiDAR sensor. In some embodiments, the tracking and prediction module 646 can be performed (e.g., run or executed) to reduce computational load by performing behavior prediction 652 on every other or after every pre-determined number of images received from a camera or point cloud data item received from the LiDAR sensor (e.g., after every two images or after every three-point cloud data items).

The behavior prediction 652 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking and prediction module 646 may assign motion pattern situational tags to the objects (e.g., "located at coordinates (x,y)," "stopped," "driving at 50 mph," "speeding up" or "slowing down"). The situation tags can describe the motion pattern of the object. The tracking and prediction module 646 may send the one or more object attributes (e.g., types of the objects) and motion pattern situational tags to the planning module 662. The tracking and prediction module 646 may perform an environment analysis 654 using any information acquired by system 600 and any number and combination of its components.

The in-vehicle control computer may include the planning module 662 that receives the object attributes and motion pattern situational tags from the tracking and prediction module 646, the drivable area and/or obstacles, and the vehicle location and pose information from the fused localization module 626 (further described below).

The planning module 662 can perform navigation planning 664 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 664 may include determining an area next to the road where the autonomous vehicle can be safely parked in case of emergencies. The planning module 662 may include behavioral decision making 666 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 662 may perform trajectory generation 668 and may select a trajectory from the set of trajectories determined by the navigation planning operation 664. The selected trajectory information may be sent by the planning module 662 to the control module 670.

The in-vehicle control computer may include a control module 670 that receives the proposed trajectory from the planning module 662 and the autonomous vehicle location and pose from the fused localization module 626. The control module 670 may include a system identifier 672. The control module 670 can perform a model-based trajectory refinement 674 to refine the proposed trajectory. For example, the control module 670 can apply filtering (e.g., Kalman filter) to make the proposed trajectory data smooth and/or to minimize noise. The control module 670 may perform the robust control 676 by determining, based on the refined proposed trajectory information and current location and/or pose of the autonomous vehicle, an amount of brake pressure to apply, a steering angle, a throttle amount to control the speed of the vehicle, and/or a transmission gear. The control module 670 can send the determined brake pressure, steering angle, throttle amount, and/or transmission gear to one or more devices in the autonomous vehicle to control and facilitate precise driving operations of the autonomous vehicle.

The deep image-based object detection 624 performed by the image-based object detection module 618 can also be used detect landmarks (e.g., stop signs, speed bumps, etc.,) on the road. The in-vehicle control computer may include a fused localization module 626 that obtains landmarks detected from images, the landmarks obtained from a map database 636 stored on the in-vehicle control computer, the landmarks detected from the point cloud data item by the LiDAR-based object detection module 612, the speed and displacement from the odometer sensor 644 and the estimated location of the autonomous vehicle from the GPS/IMU sensor 638 (e.g., GPS sensor 640 and IMU sensor 642) located on or in the autonomous vehicle. Based on this information, the fused localization module 626 can perform a localization operation 628 to determine a location of the autonomous vehicle, which can be sent to the planning module 662 and the control module 670.

The fused localization module 626 can estimate pose 630 of the autonomous vehicle based on the GPS and/or IMU sensors 638. The pose of the autonomous vehicle can be sent to the planning module 662 and the control module 670. The fused localization module 626 can also estimate status (e.g., location, possible angle of movement) of the trailer unit based on (e.g., trailer status estimation 634), for example, the information provided by the IMU sensor 642 (e.g., angular rate and/or linear velocity). The fused localization module 626 may also check the map content 632.

Figure 7:
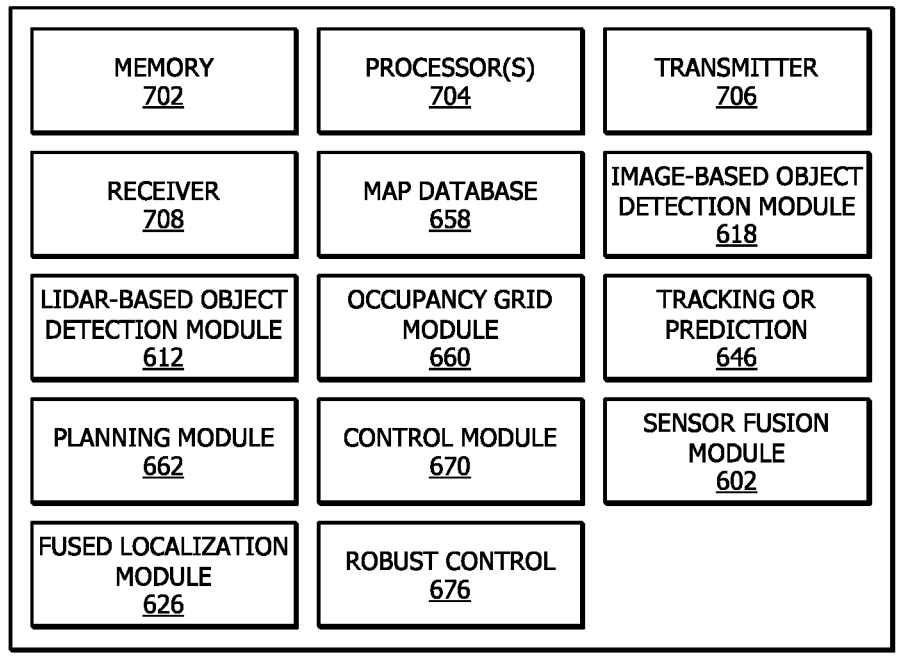
FIG. 7 illustrates a block diagram of an in-vehicle control computer included in the autonomous vehicle of FIG. 5.

FIG. 7 shows an exemplary block diagram of an in-vehicle control computer 550 included in an autonomous vehicle 502. The in-vehicle control computer 550 may include at least one processor 704 and a memory 702 having instructions stored thereupon (e.g., software instructions 128 and processing instructions 580 in FIGS. 1 and 5, respectively). The instructions, upon execution by the processor 704, configure the in-vehicle control computer 550 and/or the various modules of the in-vehicle control computer 550 to perform the operations described in FIGS. 1-6. The transmitter 706 may transmit or send information or data to one or more devices in the autonomous vehicle. For example, the transmitter 706 can send an instruction to one or more motors of the steering wheel to steer the autonomous vehicle. The receiver 708 may receive information or data transmitted or sent by one or more devices. For example, the receiver 708 may receive a status of the current speed from the odometer sensor or the current transmission gear from the transmission. The transmitter 706 and receiver 708 also may be configured to communicate with the plurality of vehicle subsystems 540 and the in-vehicle control computer 550 described above in FIGS. 4 and 5.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:

a headlight mounted on an autonomous vehicle and configured to illuminate at least a portion of a road the autonomous vehicle is on; and a control device associated with the autonomous vehicle and comprising at least one processor configured to at least:

obtain information about an environment around the autonomous vehicle;

determine that at least a portion of the road should be illuminated if the information indicates that an illumination level of the portion of the road is less than a threshold illumination level; and in response to determining that at least the portion of the road should be illuminated, adjust the headlight to illuminate at least the portion of the road.

Clause 2. The system of Clause 1, wherein the information comprises one or more of:

a road curvature indication;

a current time;

a location of the autonomous vehicle;

light sensor data captured by at least one light sensor;

an image of at least the portion of the road captured by a camera associated with the autonomous vehicle; or and an infrared image of at least the portion of the road captured by an infrared camera associated with the autonomous vehicle.

Clause 3. The system of Clause 1, wherein the information comprises a road curvature indication that indicates the road ahead of the autonomous vehicle curves to the left, and wherein to adjust the headlight, the at least one processor is further configured to at least turn on a left-side light source of the headlight.

Clause 4. The system of Clause 1, wherein the information comprises a current time, and wherein to determine that at least the portion of the road should be illuminated, the at least one processor is further configured to at least:
determine that the current time is a night time, and
adjust the headlight by turning on an infrared light source associated with the autonomous vehicle.

Clause 5. The system of Clause 1, wherein the information comprises a location of the autonomous vehicle,
wherein the at least one processor is further configured to at least:
compare the location of the autonomous vehicle with map data that comprises locations and types of roads ahead of the autonomous vehicle;
determine that the autonomous vehicle is approaching a tunnel based at least in part upon the comparison between the location of the autonomous vehicle and the map data; and
turn on the headlight before the autonomous vehicle enters the tunnel.

Clause 6. The system of Clause 5, wherein the at least one processor is further configured to at least:
determine that the autonomous vehicle is exiting the tunnel based at least on a second location of the autonomous vehicle and the map data; and
turn off the headlight after the autonomous vehicle exits the tunnel.

Clause 7. The system of Clause 1, wherein the information comprises light sensor data captured by at least one light sensor, wherein the at least one light sensor is configured to detect an illumination level of the environment around the at least one light sensor, and wherein to determine that at least the portion of the road should be illuminated, the at least one processor is further configured to at least determine that the illumination level of the road is less than the threshold illumination level.

Clause 8. A method comprising:
obtaining information about an environment around an autonomous vehicle;
determining that at least a portion of a road which the autonomous vehicle is on should be illuminated if the information indicates that an illumination level of the portion of the road is less than a threshold illumination level; and
in response to determining that at least the portion of the road should be illuminated, adjusting a headlight to illuminate at least the portion of the road, wherein the headlight is mounted on the autonomous vehicle and configured to illuminate at least a portion of the road.

Clause 9. The method of Clause 8, wherein the information comprises an image of at least the portion of the road, and wherein the method further comprises:
determining a first light condition level of the image;
determining that the first light condition level of the image is less than a threshold light condition level; and
in response to determining that the first light condition level of the image is less than the threshold light condition level, adjusting the headlight to increase the illumination level of the road until the first light condition level becomes at least equal to the threshold light condition level.

Clause 10. The method of Clause 9, wherein determining the first light condition level of the image comprises determining colors of pixels of the image, and wherein determining that the first light condition level of the image is less than the threshold light condition level comprises determining that more than a threshold percentage of pixels of the image are black.

Clause 11. The method of Clause 8, wherein the information comprises an infrared image of at least the portion of the road, and wherein the method further comprises:
determining a second light condition level of the infrared image;
determining that the second light condition level of the infrared image is less than a threshold light condition level; and
in response to determining that the second light condition level of the infrared image is less than the threshold light condition level, adjusting the headlight to increase the illumination level of the road until the second light condition level becomes at least equal to the threshold light condition level.

Clause 12. The method of Clause 11, wherein determining the second light condition level of the infrared image comprises determining colors of pixels of the infrared image, and wherein determining that the second light condition level of the infrared image is less than the threshold light condition level comprises determining that more than a threshold percentage of pixels of the infrared image are black.

Clause 13. The method of Clause 8, wherein adjusting the headlight to illuminate at least the portion of the road comprises one or more of turning on a low beam light source, turning on a high beam light source, turning on a left-side light source, turning on a right-side light source, increasing an intensity of infrared light emitted from at least one infrared light source.

Clause 14. The method of Clause 8, further comprising:
receiving sensor data captured by at least one sensor associated with the autonomous vehicle;
detecting, based on the received sensor data, an absence of oncoming traffic;
turning on one or more of a high beam infrared light source of the headlight and a high beam light source of the headlight;
determining a quality of an infrared image captured by an infrared camera associated with the autonomous vehicle;
determining that the quality of the infrared image is less than a threshold infrared image quality; and
increasing an intensity of infrared light emitted from the high beam infrared light source until the quality of the infrared image becomes at least equal to the threshold infrared image quality.

Clause 15. A non-transitory computer-readable medium storing instructions that when executed by at least one processor causes the at least one processor to:
obtain information about an environment around an autonomous vehicle;
determine that at least a portion of a road which the autonomous vehicle is on should be illuminated if the information indicates that an illumination level of the portion of the road is less than a threshold illumination level; and
in response to determining that at least the portion of the road should be illuminated, adjust a headlight to illuminate at least the portion of the road, wherein the headlight is mounted on the autonomous vehicle and configured to illuminate at least a portion of the road.

Clause 16. The non-transitory computer-readable medium of Clause 15, wherein the instructions when executed by the at least one processor, further cause the at least one processor to at least:
receive sensor data captured by at least one sensor associated with the autonomous vehicle;

detect, based on the received sensor data, a presence of oncoming traffic;

in response to the oncoming traffic being detected, turn on one or more of a low beam infrared light source of the headlight and a low beam light source of the headlight;

determine a quality of an infrared image captured by an infrared camera associated with the autonomous vehicle;

determine that the quality of the infrared image is less than a threshold infrared image quality; and increase an intensity of infrared light emitted from the low beam infrared light source until the quality of the infrared image becomes at least equal to the threshold infrared image quality.

Clause 17. The non-transitory computer-readable medium of Clause 16, wherein the at least one sensor comprises at least one of a camera, a light detection and ranging sensor, and an infrared sensor.

Clause 18. The non-transitory computer-readable medium of Clause 15, wherein the instructions when executed by the at least one processor, further cause the at least one processor to at least:

determine that the autonomous vehicle is approaching a left turn;

turn on one or more of a left-side infrared light source and a left-side light source;

determine a quality of an infrared image captured by an infrared camera associated with the autonomous vehicle;

determine that the quality of the infrared image is less than a threshold infrared image quality; and increase an intensity of infrared light emitted from the left-side infrared light source until the quality of the infrared image becomes at least equal to the threshold infrared image quality.

Clause 19. The non-transitory computer-readable medium of Clause 15, wherein the instructions when executed by the at least one processor, further cause the at least one processor to at least:

determine that the autonomous vehicle is approaching a right turn;

turn on one or more of a right-side infrared light source and a right-side light source;

determine a quality of an infrared image captured by an infrared camera associated with the autonomous vehicle;

determine that the quality of the infrared image is less than a threshold infrared image quality; and increase an intensity of infrared light emitted from the right-side infrared light source until the quality of the infrared image becomes at least equal to the threshold infrared image quality.

Clause 20. The non-transitory computer-readable medium of Clause 15, wherein the obtained information further comprises rain sensor data captured by at least one rain sensor, wherein to determine that at least the portion of the road should be illuminated, the at least one processor is further configured to at least determine that the rain sensor data indicates a rainfall level greater than a threshold rainfall level.

Clause 21. The system of any of Clause 1-7, wherein the processor is further configured to perform one or more operations according to any of Clause 8-14.

Clause 22. The system of any of Clause 1-7, wherein the processor is further configured to perform one or more operations according to any of Clause 15-20.

Clause 23. The method of any of Clause 8-14, further comprising one or more operations according to any of Clause 1-7.

Clause 24. The method of any of Clause 8-14, further comprising one or more operations according to any of Clause 15-20.

Clause 25. An apparatus comprising means for performing one or more operations according to any of Clause 8-14.

Clause 26. The non-transitory computer-readable medium of any of Clause 15-20, wherein when the instructions executed by the at least one processor, further cause the at least one processor to perform one or more operations according to any of Clause 1-7.

Clause 27. The non-transitory computer-readable medium of any of Clause 15-20, wherein when the instructions executed by the at least one processor, further cause the at least one processor to perform one or more operations according to any of Clause 8-14.

The invention claimed is:

1. A system comprising:
   a headlight mounted on an autonomous vehicle and configured to illuminate at least a portion of a road the autonomous vehicle is on; and
   a control device associated with the autonomous vehicle and comprising at least one processor configured to at least:
      obtain information about an environment around the autonomous vehicle;
      determine that at least a portion of the road should be illuminated if the information indicates that an illumination level of the portion of the road is less than a threshold illumination level; and
      in response to determining that at least the portion of the road should be illuminated, adjust the headlight to illuminate at least the portion of the road.

2. The system of claim 1, wherein the information comprises one or more of:
   a road curvature indication;
   a current time;
   a location of the autonomous vehicle;
   light sensor data captured by at least one light sensor;
   an image of at least the portion of the road captured by a camera associated with the autonomous vehicle; or
   and an infrared image of at least the portion of the road captured by an infrared camera associated with the autonomous vehicle.

3. The system of claim 1, wherein the information comprises a road curvature indication that indicates the road ahead of the autonomous vehicle curves to the left, and wherein to adjust the headlight, the at least one processor is further configured to at least turn on a left-side light source of the headlight.

4. The system of claim 1, wherein the information comprises a current time, and wherein to determine that at least the portion of the road should be illuminated, the at least one processor is further configured to at least:
   determine that the current time is a night time, and
   adjust the headlight by turning on an infrared light source associated with the autonomous vehicle.

5. The system of claim 1, wherein the information comprises a location of the autonomous vehicle,
   wherein the at least one processor is further configured to at least:
      compare the location of the autonomous vehicle with map data that comprises locations and types of roads ahead of the autonomous vehicle;
      determine that the autonomous vehicle is approaching a tunnel based at least in part upon the comparison between the location of the autonomous vehicle and the map data; and turn on the headlight before the autonomous vehicle enters the tunnel.

6. The system of claim 5, wherein the at least one processor is further configured to at least:
determine that the autonomous vehicle is exiting the tunnel based at least on a second location of the autonomous vehicle and the map data; and
turn off the headlight after the autonomous vehicle exits the tunnel.

7. The system of claim 1, wherein the information comprises light sensor data captured by at least one light sensor, wherein the at least one light sensor is configured to detect an illumination level of the environment around the at least one light sensor, and wherein to determine that at least the portion of the road should be illuminated, the at least one processor is further configured to at least determine that the illumination level of the road is less than the threshold illumination level.

8. A method comprising:
obtaining information about an environment around an autonomous vehicle;
determining that at least a portion of a road which the autonomous vehicle is on should be illuminated if the information indicates that an illumination level of the portion of the road is less than a threshold illumination level; and
in response to determining that at least the portion of the road should be illuminated, adjusting a headlight to illuminate at least the portion of the road, wherein the headlight is mounted on the autonomous vehicle and configured to illuminate at least a portion of the road.

9. The method of claim 8, wherein the information comprises an image of at least the portion of the road, and wherein the method further comprises:
determining a first light condition level of the image;
determining that the first light condition level of the image is less than a threshold light condition level; and
in response to determining that the first light condition level of the image is less than the threshold light condition level, adjusting the headlight to increase the illumination level of the road until the first light condition level becomes at least equal to the threshold light condition level.

10. The method of claim 9, wherein determining the first light condition level of the image comprises determining colors of pixels of the image, and wherein determining that the first light condition level of the image is less than the threshold light condition level comprises determining that more than a threshold percentage of pixels of the image are black.

11. The method of claim 8, wherein the information comprises an infrared image of at least the portion of the road, and wherein the method further comprises:
determining a second light condition level of the infrared image;
determining that the second light condition level of the infrared image is less than a threshold light condition level; and
in response to determining that the second light condition level of the infrared image is less than the threshold light condition level, adjusting the headlight to increase the illumination level of the road until the second light condition level becomes at least equal to the threshold light condition level.

12. The method of claim 11, wherein determining the second light condition level of the infrared image comprises determining colors of pixels of the infrared image, and wherein determining that the second light condition level of the infrared image is less than the threshold light condition level comprises determining that more than a threshold percentage of pixels of the infrared image are black.

13. The method of claim 8, wherein adjusting the headlight to illuminate at least the portion of the road comprises one or more of turning on a low beam light source, turning on a high beam light source, turning on a left-side light source, turning on a right-side light source, increasing an intensity of infrared light emitted from at least one infrared light source.

14. The method of claim 8, further comprising:
receiving sensor data captured by at least one sensor associated with the autonomous vehicle;
detecting, based on the received sensor data, an absence of oncoming traffic;
turning on one or more of a high beam infrared light source of the headlight and a high beam light source of the headlight;
determining a quality of an infrared image captured by an infrared camera associated with the autonomous vehicle;
determining that the quality of the infrared image is less than a threshold infrared image quality; and
increasing an intensity of infrared light emitted from the high beam infrared light source until the quality of the infrared image becomes at least equal to the threshold infrared image quality.

15. A non-transitory computer-readable medium storing instructions that when executed by at least one processor cause the at least one processor to:
obtain information about an environment around an autonomous vehicle;
determine that at least a portion of a road which the autonomous vehicle is on should be illuminated if the information indicates that an illumination level of the portion of the road is less than a threshold illumination level; and
in response to determining that at least the portion of the road should be illuminated, adjust a headlight to illuminate at least the portion of the road, wherein the headlight is mounted on the autonomous vehicle and configured to illuminate at least a portion of the road.

16. The non-transitory computer-readable medium of claim 15, wherein the instructions when executed by the at least one processor, further cause the at least one processor to at least:
receive sensor data captured by at least one sensor associated with the autonomous vehicle;
detect, based on the received sensor data, a presence of oncoming traffic;
in response to the oncoming traffic being detected, turn on one or more of a low beam infrared light source of the headlight and a low beam light source of the headlight;
determine a quality of an infrared image captured by an infrared camera associated with the autonomous vehicle;
determine that the quality of the infrared image is less than a threshold infrared image quality; and
increase an intensity of infrared light emitted from the low beam infrared light source until the quality of the infrared image becomes at least equal to the threshold infrared image quality.

17. The non-transitory computer-readable medium of claim 16, wherein the at least one sensor comprises at least one of a camera, a light detection and ranging sensor, and an infrared sensor.

18. The non-transitory computer-readable medium of claim 15, wherein the instructions when executed by the at least one processor, further cause the at least one processor to at least:
- determine that the autonomous vehicle is approaching a left turn;
- turn on one or more of a left-side infrared light source and a left-side light source;
- determine a quality of an infrared image captured by an infrared camera associated with the autonomous vehicle;
- determine that the quality of the infrared image is less than a threshold infrared image quality; and
- increase an intensity of infrared light emitted from the left-side infrared light source until the quality of the infrared image becomes at least equal to the threshold infrared image quality.

19. The non-transitory computer-readable medium of claim 15, wherein the instructions when executed by the at least one processor, further cause the at least one processor to at least:
- determine that the autonomous vehicle is approaching a right turn;
- turn on one or more of a right-side infrared light source and a right-side light source;
- determine a quality of an infrared image captured by an infrared camera associated with the autonomous vehicle;
- determine that the quality of the infrared image is less than a threshold infrared image quality; and
- increase an intensity of infrared light emitted from the right-side infrared light source until the quality of the infrared image becomes at least equal to the threshold infrared image quality.

20. The non-transitory computer-readable medium of claim 15, wherein the obtained information further comprises rain sensor data captured by at least one rain sensor, wherein to determine that at least the portion of the road should be illuminated, the at least one processor is further configured to at least determine that the rain sensor data indicates a rainfall level greater than a threshold rainfall level.

* * * * *